(12) United States Patent
Fukao

(10) Patent No.: US 7,081,972 B2
(45) Date of Patent: Jul. 25, 2006

(54) IMAGE PROCESSING APPARATUS AND IMAGE PROCESSING METHOD

(75) Inventor: Suzuko Fukao, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 960 days.

(21) Appl. No.: 09/953,953

(22) Filed: Sep. 18, 2001

(65) Prior Publication Data

US 2002/0054354 A1 May 9, 2002

(30) Foreign Application Priority Data

Sep. 20, 2000 (JP) .............................. 2000-285373
Oct. 10, 2000 (JP) .............................. 2000-309828

(51) Int. Cl.
*H04N 1/40* (2006.01)
*H04N 1/405* (2006.01)

(52) U.S. Cl. ..................................... 358/3.04; 382/252

(58) Field of Classification Search ................. 358/1.9, 358/3.03–3.05, 3.26, 3.06, 534, 504; 382/237, 382/252; 345/596, 616
See application file for complete search history.

(56) References Cited

U.S. PATENT DOCUMENTS

| 5,201,013 | A | * | 4/1993 | Kumagai | .................... 358/3.04 |
| 5,226,096 | A | * | 7/1993 | Fan | ........................... 358/3.03 |
| 5,535,019 | A | * | 7/1996 | Eschbach | .................. 358/3.03 |
| 5,565,994 | A | * | 10/1996 | Eschbach | .................. 358/3.03 |
| 5,583,644 | A | * | 12/1996 | Sasanuma et al. | .......... 358/504 |
| 5,638,188 | A | | 6/1997 | Moro et al. | ................. 358/3.03 |
| 5,649,073 | A | * | 7/1997 | Knox et al. | ................... 358/1.9 |
| 5,696,846 | A | * | 12/1997 | Shimazaki | ................. 358/3.04 |
| 5,737,453 | A | | 4/1998 | Ostromoukhov | ............ 382/275 |

(Continued)

FOREIGN PATENT DOCUMENTS

JP 10-312458 11/1998

(Continued)

OTHER PUBLICATIONS

R.W. Floyd, et al., "An Adaptive Algorithm for Spatial Greyscale", Proceedings Of The Society For Information Display, vol. 17, No. 2, Second Quarter 1976, p. 62 & p. 75-77.

(Continued)

*Primary Examiner*—Scott A. Rogers
(74) *Attorney, Agent, or Firm*—Fitzpatrick, Cella, Harper & Scinto

(57) ABSTRACT

In order to acquire a good binary image at all levels of gray scale, an image processing apparatus for quantizing input multivalued image data by a multivalued error diffusion method, selecting a predetermined dot pattern based on the quantized image data and outputting a binary image is configured to have an error calculation division for calculating corrected value from a pixel value and a processed pixel diffusion error of an input image, and calculating a quantization error from an output density level corresponding to the corrected value, an image generation division for first acquiring a diffusion coefficient corresponding to a pixel value of the input image, and distributing the quantization error to surrounding pixels according to a weight assignment by the diffusion coefficient to generate the binary image, a diffusion coefficient generation division for generating a plurality of candidate diffusion coefficients, a computing division for acquiring an evaluation value for the binary image generated by the image generation division, and a selection division for selecting the diffusion coefficient corresponding to the pixel value of the input image from the plurality of candidate diffusion coefficients based on the above evaluation value.

27 Claims, 40 Drawing Sheets

U.S. PATENT DOCUMENTS

| | | | |
|---|---|---|---|
| 5,757,976 A * | 5/1998 | Shu | 382/252 |
| 5,905,816 A * | 5/1999 | Shimazaki | 382/252 |
| 6,172,768 B1 * | 1/2001 | Yamada et al. | 358/1.9 |
| 6,356,362 B1 * | 3/2002 | Ostromoukhov | 358/1.9 |
| 6,510,252 B1 * | 1/2003 | Kishimoto | 382/252 |
| 6,771,832 B1 * | 8/2004 | Naito et al. | 382/252 |
| 6,870,642 B1 * | 3/2005 | Ostromoukhov | 358/3.03 |
| 2002/0181023 A1 * | 12/2002 | Gorian et al. | 358/3.04 |
| 2005/0007635 A1 * | 1/2005 | Kang et al. | 358/3.04 |

FOREIGN PATENT DOCUMENTS

JP     2000341520 A * 12/2000

OTHER PUBLICATIONS

R.W. Floyd, et al., "4.3: An Adaptive Algorithm for Spatial Grey Scale", SID Int. Sym. Digest of Tech. Papers, 1975, pp. 36-37.

* cited by examiner

FIG. 2

|     | $K_1$ | $K_2$ | $K_3$ | $K_4$ |
| --- | --- | --- | --- | --- |
| 0   | 0.56 | 0.22 | 0.11 | 0.11 |
| 1   | 0.56 | 0.22 | 0.11 | 0.11 |
| 2   | 0.47 | 0.33 | 0.07 | 0.13 |
| ... | ... | ... | ... | ... |
| 252 | 0.44 | 0.19 | 0.31 | 0.06 |
| 253 | 0.47 | 0.33 | 0.07 | 0.13 |
| 254 | 0.56 | 0.22 | 0.11 | 0.11 |
| 255 | 0.56 | 0.22 | 0.11 | 0.11 |

INPUT BUFFER

INPUT DATA 0~255

FIG. 7

| CORRECTED INPUT PIXEL VALUE | OUTPUT DENSITY LEVEL |
|---|---|
| $-8 \leq I'(x) < 8$ | 0 |
| $8 \leq I'(x) < 24$ | 16 |
| $24 \leq I'(x) < 40$ | 32 |
| $40 \leq I'(x) < 56$ | 48 |
| $56 \leq I'(x) < 72$ | 64 |
| $72 \leq I'(x) < 88$ | 80 |
| $88 \leq I'(x) < 104$ | 96 |
| $104 \leq I'(x) < 120$ | 112 |
| $120 \leq I'(x) < 136$ | 128 |
| $136 \leq I'(x) < 152$ | 144 |
| $152 \leq I'(x) < 168$ | 160 |
| $168 \leq I'(x) < 184$ | 176 |
| $184 \leq I'(x) < 200$ | 192 |
| $200 \leq I'(x) < 216$ | 208 |
| $216 \leq I'(x) < 232$ | 224 |
| $232 \leq I'(x) < 248$ | 240 |
| $248 \leq I'(x) < 264$ | 256 |

* ATTENTIONAL PIXEL

FIG. 11

$$\frac{\begin{bmatrix} & * & C_1 \\ C_2 & C_3 & C_4 \end{bmatrix}}{\sum_{m=1}^{4} C_m}$$

$C_m = 0, 1, \ldots, 9$ $\sum_m C_m \neq 0$

F I G. 22
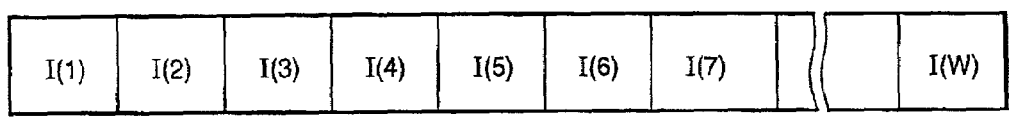

OUTPUT BUFFER

FIG. 24

ERROR BUFFER

| E(1) | E(2) | E(3) | E(4) | E(5) | E(6) | E(7) | E(W+2) |
|------|------|------|------|------|------|------|--------|
| $E_{temp}$ | | | | | | | |

F I G. 27
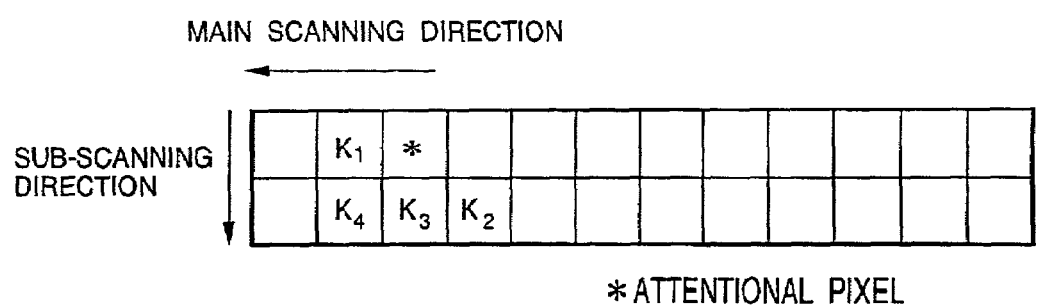

FIG. 34

| 1/8 | 1/2 | 1/8 |
|-----|-----|-----|
| 1/2 | *   | 1/2 |
| 1/8 | 1/2 | 1/8 |

* ATTENTIONAL PIXEL

FIG. 40

|     | $K_1$ | $K_2$ | $K_3$ | $K_4$ |
|-----|-------|-------|-------|-------|
| 0   | 0     | 0     | 0     | 0     |
| 1   | 0.56  | 0.22  | 0.11  | 0.11  |
| 2   | 0.47  | 0.33  | 0.07  | 0.13  |
| 252 | 0.44  | 0.19  | 0.31  | 0.06  |
| 253 | 0.47  | 0.33  | 0.07  | 0.13  |
| 254 | 0.56  | 0.22  | 0.11  | 0.11  |
| 255 | 0     | 0     | 0     | 0     |

IMAGE PROCESSING APPARATUS AND IMAGE PROCESSING METHOD

FIELD OF THE INVENTION

The present invention relates to an image processing method and an apparatus for converting an inputted multi-level gray scale image into an image having a smaller number of levels of gray scale than the input image.

BACKGROUND OF THE INVENTION

Conventionally, there is the error diffusion method ("An adaptive algorithm for spatial gray scale", SID International Symposium Digest of Technical Papers, vol4.3, 1975, pp.36–37) by R. Floyd et al. as means for converting a multivalued image data into a binary image (or an image that has a fewer levels of gray scale than the inputted levels of gray scale). The error diffusion method diffuses a binarization error generated in a pixel to a plurality of pixels thereafter so as to artificially represent a gray scale. While this error diffusion method allows binarization of high image quality, it has a fault that excessive processing time is required. In the case of performing binarization by using a density pattern method wherein a pixel of the multivalued image is represented by a plurality of binary pixels, high-speed binarization can be performed. However, in this case the error arising cannot be propagated and limitation to gray scale representation arises, and so a problem remains in terms of the image quality.

It is possible to acquire a high-speed and high-quality binary image by using an image processing apparatus characterized by, as disclosed in U.S. Pat. No. 5,638,188, having input means for inputting multivalued data, computing means for computing error corrected value by adding error data to the input multivalued data, selection means for selecting a predetermined dot pattern based on the above described error corrected value, error computing means for computing a difference between a predetermined value assigned for each of the dot pattern and the above described error corrected value, and storage means for storing the above described difference in memory as error data.

The conventional error diffusion method uses a fixed weight (a diffusion coefficient) when diffusing a binarization error regardless of the input value. However, the conventional method has a problem that the dots are generated successively in a chain-like manner without being evenly distributed in highlight and shadow regions. For this reason, even with the above image processing apparatus, desirable results cannot be acquired, as the problem of the error diffusion method affects the output binary image. Moreover, in the case where the above dot pattern and error diffusion coefficient are selected separately, there is a problem that their combination may not yield the desirable binarization results.

In addition, as a related conventional technology, the error diffusion method wherein different diffusion coefficients are used according to input gray level value is disclosed in Japanese Patent Laid-Open No. 10-312458.

This method defines a first diffusion coefficient for highlight and shadow regions, and a second diffusion coefficient for a mid-tone region. The two diffusion coefficients are linear-interpolated to be used for the transition region between highlights and mid-tones, and for the transition region between mid-tones and shadows.

However, in the above conventional method, while the diffusion coefficients for highlight and shadow regions and for mid-tone regions are defined, diffusion coefficients for other regions are obtained by linear-interpolating the two diffusion coefficients. Therefore optimum diffusion coefficients are not defined for all levels of gray scale. In addition, there are no grounds even for the gray levels of which diffusion coefficients are exactly defined, that the defined diffusion coefficients are optimum. Furthermore, there is a problem that the optimum diffusion coefficients depend on conditions such as resolution of the image.

SUMMARY OF THE INVENTION

The present invention has been proposed to solve the conventional problems, and has as its object, in a process of converting an inputted multi-level gray scale image into an image having a fewer levels of gray scale than the input image, to provide an image processing method and an image processing apparatus capable of acquiring satisfactory processing results for all levels of gray scale.

In order to attain the above object, an image processing apparatus according to the present invention for quantizing input multivalued image data by a multivalued error diffusion method, selecting a predetermined dot pattern based on the quantized image data and outputting a binary image has:

error calculation means for calculating corrected value from a gray-level pixel value and a processed pixel diffusion error of the input image, and calculating a quantization error from the pixel value and an output density level corresponding to the corrected value;

image generation means for first acquiring a diffusion coefficient corresponding to a pixel value of the above described input image, and distributing the above described quantization error to surrounding pixels according to a weight assignment by the diffusion coefficient to generate a binary image;

diffusion coefficient generation means for generating a plurality of candidate diffusion coefficients;

computing means for acquiring an evaluation value for the binary image generated by the above described image generation means;

selection means for selecting the diffusion coefficient corresponding to the pixel value of the above described input image from the above described plurality of candidate diffusion coefficients based on the above described evaluation value.

Preferably, in the above image processing apparatus, the above described image generation means generates the binary image from the above described candidate diffusion coefficients.

Preferably, in the above image processing apparatus, the above described computing means converts an output image into a frequency domain and performs computation in the frequency domain.

Preferably, in the above image processing apparatus, the above described selection means selects, based on the evaluation values for each gray level value of the input image, an error diffusion coefficient that yields the minimum evaluation value.

Preferably, in the above image processing apparatus, the above described selection means selects the error diffusion coefficient based on a plurality of the evaluation values of a plurality of gray level values.

In addition, an image processing method according to the present invention for quantizing input multivalued image data by a multivalued error diffusion method, selecting a predetermined dot pattern based on the quantized image data and outputting a binary image has:

an error calculation step of calculating corrected value from a gray-level pixel value and a processed pixel diffusion error of an input image, and calculating a quantization error from the pixel value and an output density level corresponding to the corrected value;

an image generation step of acquiring a diffusion coefficient corresponding to a pixel value of the above described input image, and distributing the above described quantization error to surrounding pixels according to a weight assignment by the diffusion coefficient to generate the binary image;

a diffusion coefficient generation step of generating a plurality of candidate diffusion coefficients;

a computing step of acquiring an evaluation value for the binary image generated in the above described image generation step;

a selection step of selecting a diffusion coefficient corresponding to the pixel value of the above described input image from the above described plurality of candidate diffusion coefficients based on the above described evaluation value.

Preferably, in the above image processing method, the above described image generation step generates the binary image from the above described candidate diffusion coefficients.

Preferably, in the above image processing method, the above described computing step converts an output image into a frequency domain and performs computation in the frequency domain.

Preferably, in the above image processing method, the above described selection step selects, based on the evaluation values for each gray level value of the input image, an error diffusion coefficient that yields the minimum evaluation value.

Preferably, in the above image processing method, the above described selection step selects the error diffusion coefficient based on a plurality of the evaluation values for a plurality of gray level values.

Moreover, an image processing apparatus according to the present invention for converting a multi-level gray scale input image into an image having a smaller number of levels of gray scale has:

generation means for generating a parameter for the process of converting the multi-level gray scale input image into the image having a smaller number of levels of gray scale according to a characteristic of the input image;

computing means for acquiring an evaluation value of the output image having a smaller number of levels of gray scale than the above described input image; and selection means for selecting the above described parameter based on the above described evaluation value.

Preferably, in the above image processing apparatus, the above described computing means computes the evaluation value of the output image according to a characteristic of the output unit.

Preferably, in the above image processing apparatus, the above described computing means involves the step of converting the output image into a frequency domain and processing in the frequency domain.

Preferably, in the above image processing apparatus, the characteristic of the above described input image is an input pixel value.

Preferably, in the above image processing apparatus, the process of converting the input image into an image having a smaller number of levels of gray scale is the error diffusion method.

Preferably, in the above image processing apparatus, the above described parameter is the error diffusion coefficient of the above described error diffusion method.

Preferably, in the above image processing apparatus, the characteristic of the above described output unit includes any or all of resolution, dot size and ink concentration.

Preferably, in the above image processing apparatus, the above described computing means includes rendering the above described output image as multi-level gray scale.

Preferably, in the above image processing apparatus, the above described computing means includes changing the size of the above described output image.

Preferably, in the above image processing apparatus, the above described error diffusion method sets the initial error value of the input pixel value and the output pixel value to 0.

Preferably, in the above image processing apparatus, the above described error diffusion method may set an initial error value of the input pixel value and the output pixel value to a random number.

Preferably, in the above image processing apparatus, the above described error diffusion coefficient is, if the input gray level is a maximum value, the same as the diffusion coefficient of one level lower gray scale, and if the input gray level is a minimum value, the same as the diffusion coefficient of one level higher gray scale.

Preferably, in the above image processing apparatus, the above described error diffusion coefficient is 0 if the input gray level is a maximum or minimum value.

Furthermore, an image processing method according to the present invention for converting a multi-level gray scale input image into an image having a smaller number of levels of gray scale has:

a generation step of generating a parameter for the process of converting the multi-level gray scale input image into the image having a smaller number of levels of gray scale according to a characteristic of the input image;

a computing step of acquiring an evaluation value of the output image having a smaller number of levels of gray scale than the above described input image; and a selection step of selecting the above described parameter based on the above described evaluation value.

In addition, a computer-readable storage medium according to the present invention storing an image processing program for converting a multi-level gray scale input image into an image having a smaller number of levels of gray scale has:

a generation module for generating a parameter for a process of converting the multi-level gray scale input image into an image having a smaller number of levels of gray scale according to a characteristic of the input image;

a computing module for acquiring an evaluation value of the output image having a smaller number of levels of gray scale than the above described input image; and a selection module for selecting the above described parameter based on the above described evaluation value.

Furthermore, a computer-readable storage medium according to the present invention storing an image processing program for converting a multi-level gray scale input image into an image having a smaller number of levels of gray scale has:

an error calculation module for calculating corrected value from a gray-level pixel value and a processed pixel diffusion error of the input image, and calculating a quantization error from the pixel value and an output density level corresponding to the corrected value;

an image generation module for acquiring a diffusion coefficient corresponding to a pixel value of the above described input image, and distributing the above described quantization error to surrounding pixels according to a weight assignment by the diffusion coefficient to generate the binary image;

a diffusion coefficient generation module for generating a plurality of candidate diffusion coefficients;

a computing module for acquiring an evaluation value for the binary image generated by the above described image generation module;

a selection module for selecting the diffusion coefficient corresponding to the pixel value of the above described input image from the above described plurality of candidate diffusion coefficients based on the above described evaluation value.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a diagram showing an example of a diffusion coefficient table 13;

FIG. 7 is a diagram showing an example of a level dividing table 23;

FIG. 11 is a diagram explaining candidate diffusion coefficients;

FIG. 22 is a diagram showing configuration of an input buffer 302 according to the third embodiment;

FIG. 24 is a diagram showing configuration of an error buffer 308 according to the third embodiment;

FIG. 27 is a diagram for explaining reversing of the processing direction of error diffusion;

FIG. 34 is a diagram showing an example of an overlapping area rate of dots in an adjacent dot area;

FIG. 37A shows the input binary image and FIG. 37B shows the converted multivalued image;

FIG. 40 is a diagram showing an example of a diffusion coefficient table according to a seventh embodiment.

DETAILED DESCRIPTION OF THE PREFERRED EMBODIMENTS

Preferred embodiments of the present invention will now be described in detail in accordance with the accompanying drawings.

First Embodiment

Figure 1:
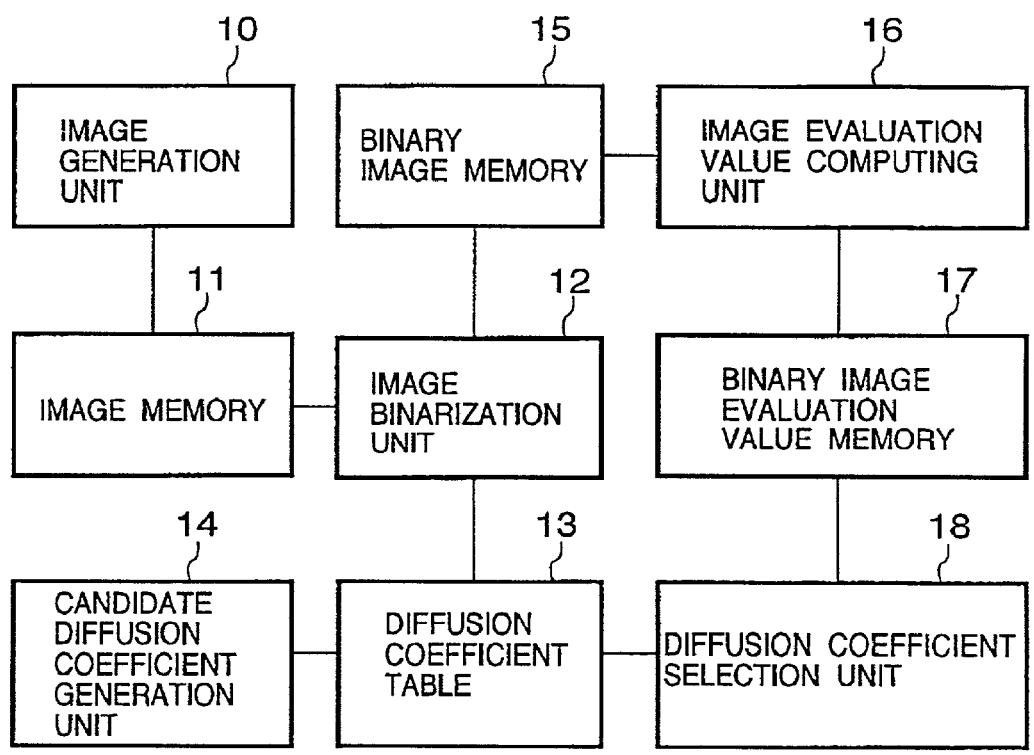
FIG. 1 is a block diagram showing configuration of an image processing apparatus that is an embodiment of the present invention.

FIG. 1 is a block diagram showing configuration of an image processing apparatus that is an embodiment of the present invention. In this diagram, reference numeral 10 denotes an image generation unit, and input image data generated in this unit is stored in image memory 11. Reference numeral 12 denotes an image binarization unit, which binarizes multivalued image data stored in the image memory 11 by the method mentioned later. Reference numeral 13 denotes a diffusion coefficient table, which is a table storing a weight assignment (a diffusion coefficient) for each gray level value in performing a quantization error distribution process of pixels. Reference numeral 14 denotes a candidate diffusion coefficient generation unit, which sequentially generates diffusion coefficients to be reviewed as candidates for coefficients to be stored in the diffusion coefficient table 13.

Reference numeral 15 denotes a binary image memory, which stores image data binarized in the image binarization unit 12. Reference numeral 16 denotes a binary image evaluation value computing unit, which computes an evaluation value of the binary image. Binary image evaluation value data computed by this unit is stored in a binary image evaluation value memory 17. Reference numeral 18 denotes a diffusion coefficient selection unit for selecting a diffusion coefficient from candidate diffusion coefficients based on the binary image evaluation values stored in the binary image evaluation value memory 17, and the diffusion coefficient selected by this unit is eventually stored in the diffusion coefficient table 13.

FIG. 2 is a diagram showing an example of a diffusion coefficient table 13 according to this embodiment. As shown in the diagram, the values in a horizontal row are the diffusion coefficients in distributing a quantization error of an attentional pixel to surrounding pixels, where real numbers in the range of 0 to 1 are stored. The numbers on the left outside the column represent input pixel values. In addition, the numbers above the column represent relative positions of the pixels in which the quantization error is to be distributed.

Figure 3:
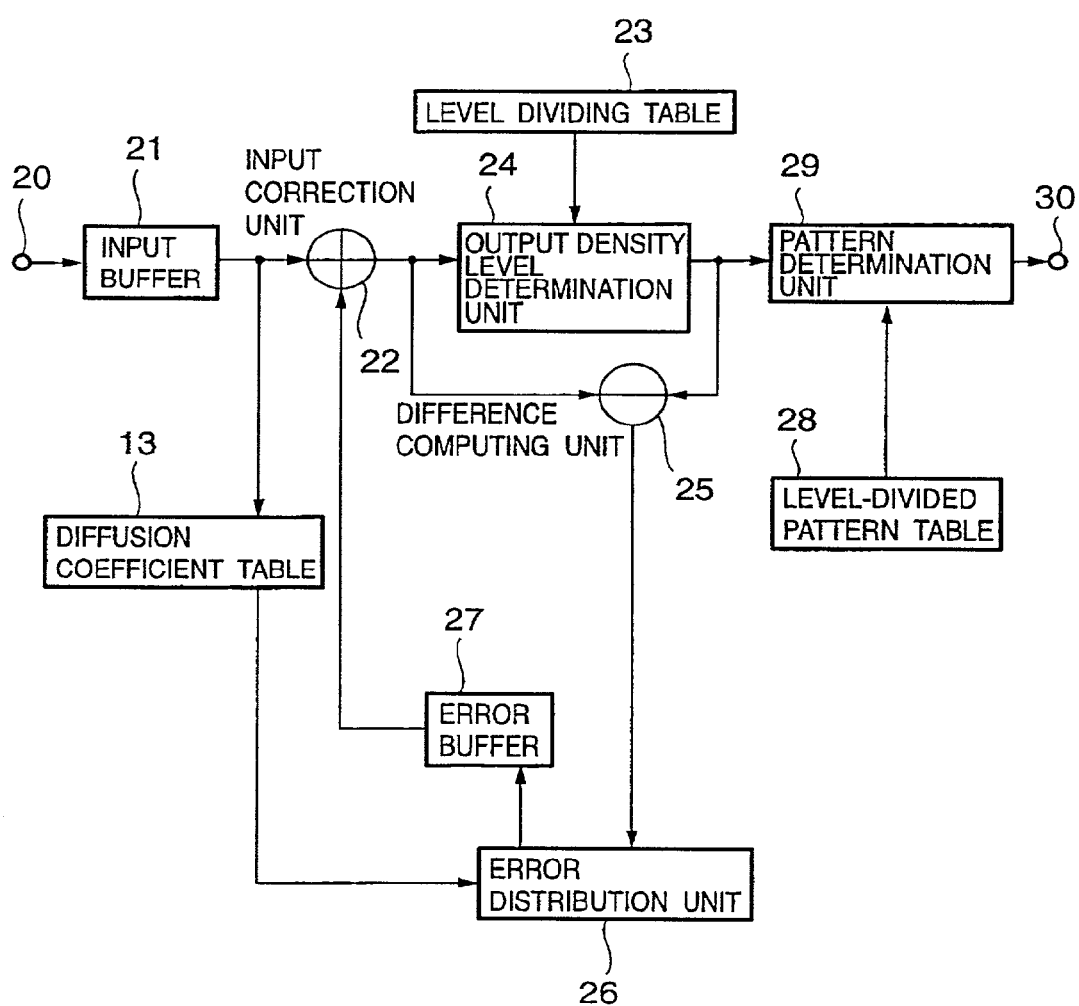
FIG. 3 is a block diagram showing configuration of an image binarization unit 12.

FIG. 3 is a block diagram showing configuration of an image binarization unit 12 according to this embodiment. In this diagram, reference numeral 20 denotes a data input terminal, which reads 8-bit input values in the range of 0 to 255. Reference numeral 21 denotes an input buffer, which stores the input data equivalent to a line of the input image. Reference numeral 22 denotes an input correction unit, which adds cumulative errors from processed pixels to input data equivalent to a pixel. 23 is a level dividing table, which is a table storing thresholds for dividing corrected data into levels. Reference numeral 24 denotes an output density level determination unit, which determines an output density level for the input data corrected by the input correction unit 22.

Reference numeral 25 denotes a difference computing unit, which computes a quantization error against the attentional pixel. Reference numeral 26 denotes an error distribution unit, which diffuses the quantization error computed by the difference computing unit 25 to the surrounding pixels. Reference numeral 27 denotes an error buffer, which is a RAM for storing the error diffused to the pixels surrounding the attentional pixel. Reference numeral 28 denotes a level-divided pattern table storing a dot pattern for each output density level. Reference numeral 29 denotes a pattern determination unit for selecting a dot pattern from patterns stored in the level-divided pattern table 28 according to the output density level determined by the output density level determination unit 24. Reference numeral 30 denotes an output terminal of a binary signal of the output level 0 or 255.

The input image in this case refers to the multivalued image data of which each pixel is 8-bit and has a value in the range of 0 to 255. In addition, a horizontal size (number of pixels) W and a vertical size H of the input image are specified by an unillustrated method.

Figure 4:
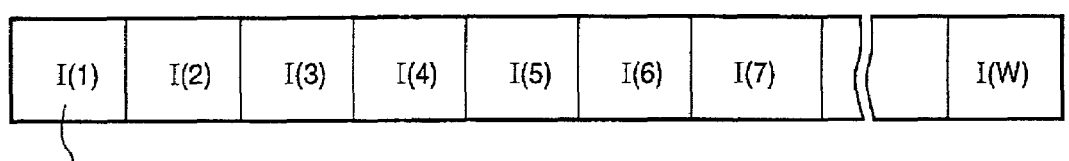
FIG. 4 is a diagram showing a configuration example of an input buffer 21.

FIG. 4 is a diagram showing an input buffer 21 in this embodiment. The value in each box is the input pixel value, where the value can be any integer between 0 and 255.

Figure 5:
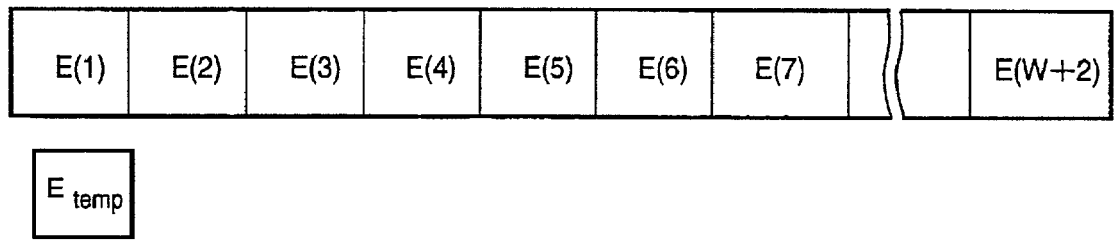
FIG. 5 is a diagram showing a configuration example of an error buffer 27.

FIG. 5 is a diagram showing an error buffer 27 in this embodiment. The value in each box is the cumulative errors from already processed pixels, where the value is a real number in the range of −8 to 8. In addition, this buffer has a margin of two pixels over the horizontal size W of the input image to cope with line end processing.

Figure 6:
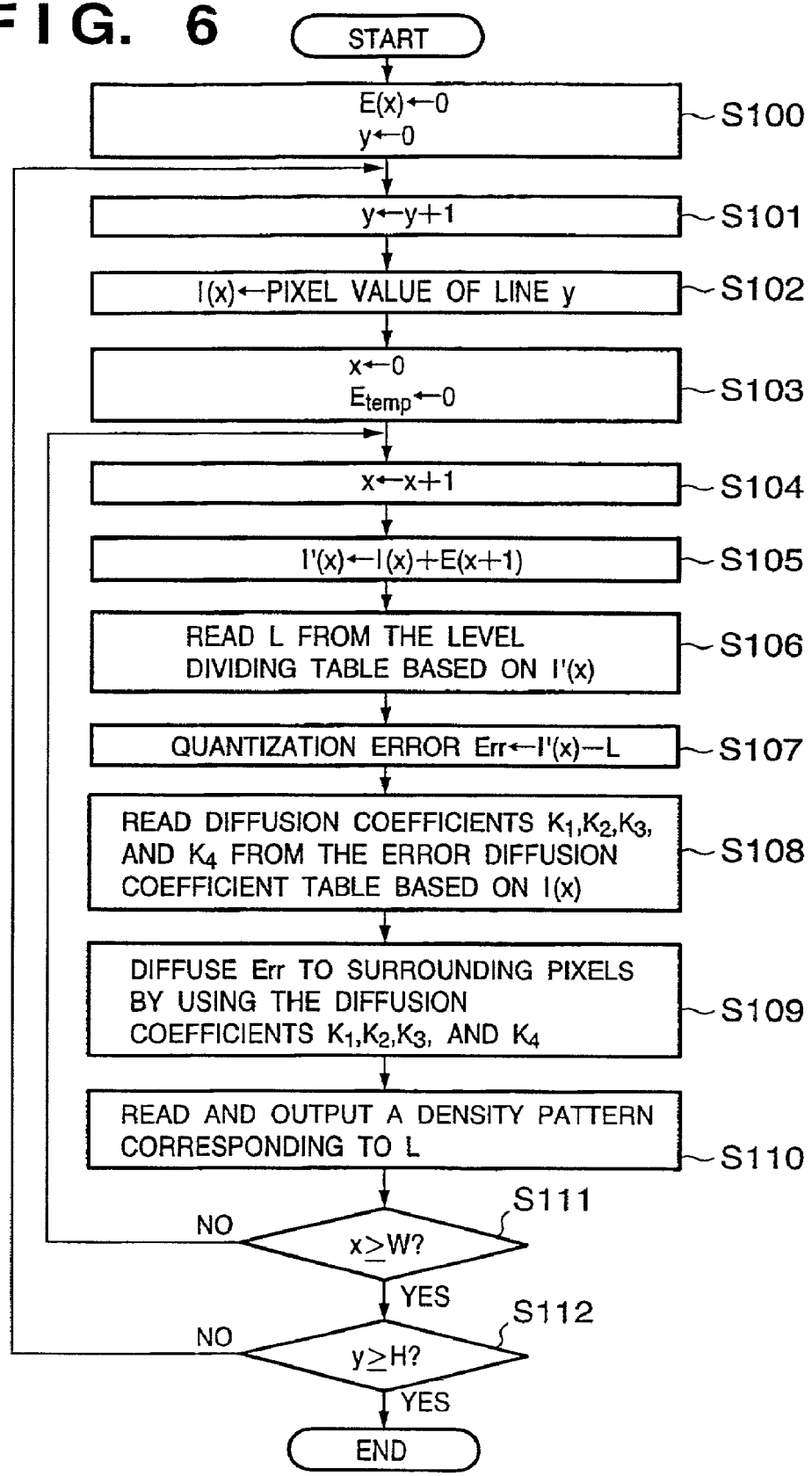
FIG. 6 is a flowchart showing a binarization process of a first embodiment.

FIG. 6 is a flowchart showing a procedure for converting the input image into a binary image by the image processing apparatus in FIG. 1. This flowchart has a sub-scanning direction line number y, a main scanning direction dot number x, where a binarization process is performed from the upper left corner to the lower right of the image.

The procedure of binarization of this image processing apparatus will be described according to FIG. 6. First, the line number y is initialized to 0, and the values of E (1) to E (W+2) of the error buffer in FIG. 5 are set to 0 (step S100).

Next, the value of y is incremented (step S101), and pixel value data on the y-th line is read into the input buffer 21 (step S102). Specifically, the input data of the x-th dot on the y-th line is assigned to I (x) for x=1 to x=W.

After reading the data equivalent to one line, a pixel position x and $E_{temp}$ of the error buffer are set to the initial value of 0 (step S103). Thereafter, the value of x is incremented (step S104), and a diffusion error E (x+1) from a processed pixel mentioned later is added to the x-th input value I (x) to obtain the corrected value I' (x) (step S105). The output density level L which corresponds to the corrected value I' (x) is obtained from the level dividing table 23 (step S106). FIG. 7 is a diagram showing an example of the level dividing table. The quantization error Err is then acquired by computing the difference between the output density level L and the corrected value I' (x) of the attentional pixel (step S107).

Figure 8:
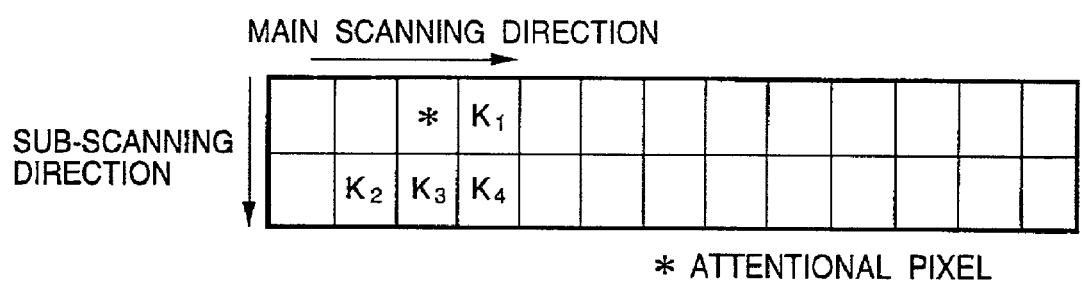
FIG. 8 is a diagram explaining error diffusion.

Next, this quantization error Err is distributed to surrounding pixels. A weight assignment (a diffusion coefficient) for this distribution process depends on the input value I (x). First, the diffusion coefficient corresponding to the input value I (x) is read from the diffusion coefficient table 13 (step S108), and the quantization error Err is distributed to surrounding pixels according to the weight assignment. In the present embodiment, diffusion coefficients $K_1$, $K_2$, $K_3$ and $K_4$ are read from the diffusion coefficient table 13, and the quantization error Err is distributed to unprocessed pixels surrounding the attentional pixel as shown in FIG. 8. The distributed error is stored in the error buffer as follows (step S109).

$$\left. \begin{array}{l} E(x+2) = E(x+2) + K_1 \cdot Err \\ E(x) = E(x) + K_2 \cdot Err \\ E(x+1) = E_{temp} + K_3 \cdot Err \\ E_{temp} = K_4 \cdot Err \end{array} \right\} \quad (1)$$

Figure 9:
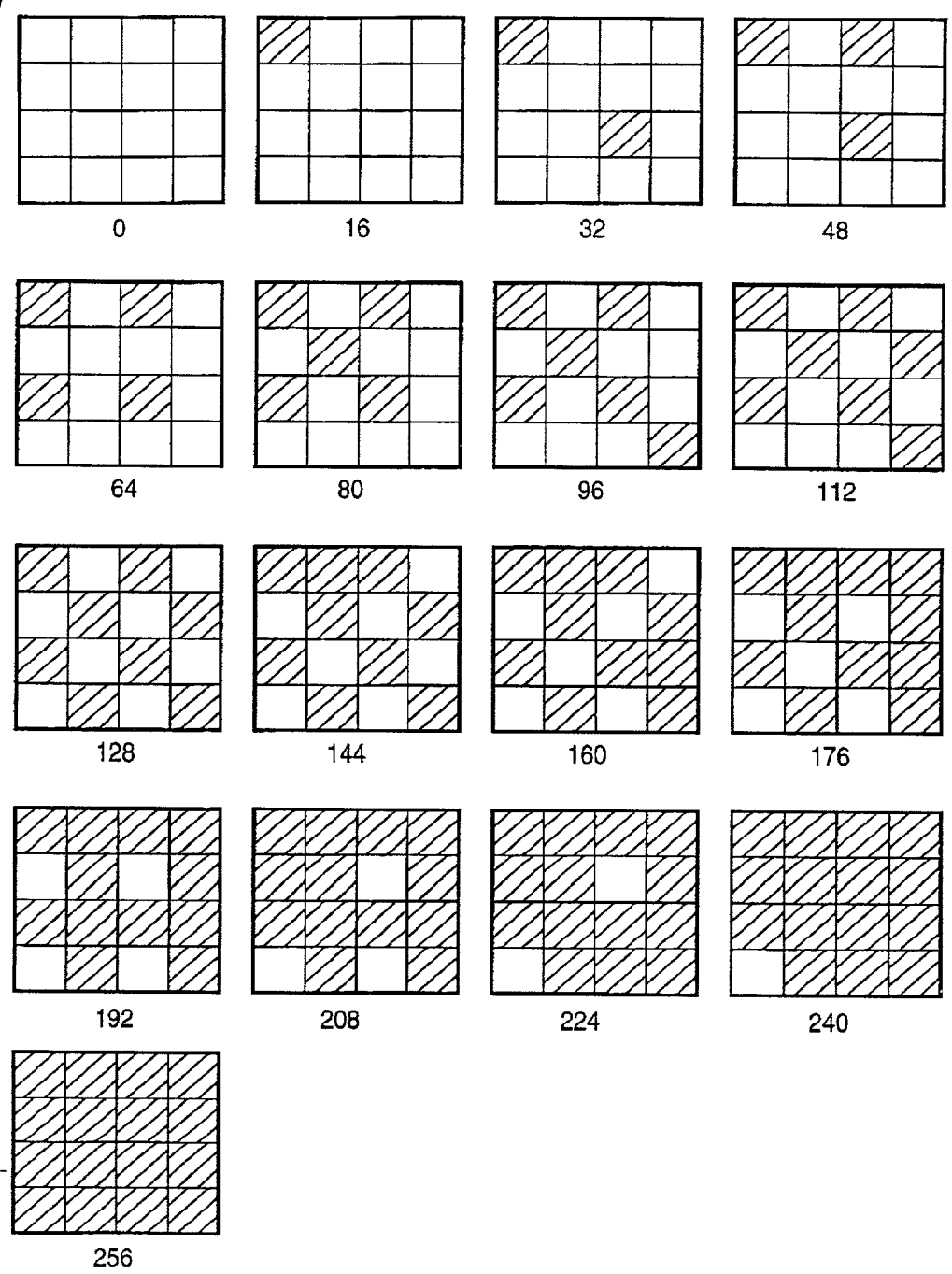
FIG. 9 is a diagram showing an example of an output dot pattern.

Thereafter, a pattern determination unit 31 selects the dot pattern of the output density level L from a level-divided pattern table 28 and outputs the selected dot pattern (step S110). FIG. 9 is a diagram showing an example of output dot patterns, where the number below each pattern indicates the output density level.

Next, it is determined whether or not the attentional pixel position x has reached the end of line (step S111). If it has not reached the end, the processes from the step S104 to step S110 are repeated. On finishing the processing to the end of line, it is determined whether or not the line number y has reached the maximum value H (step S112). If y is smaller than H, the processing from the step S101 to the step S112 is repeated. If y has reached H, this process is terminated.

Figure 10:
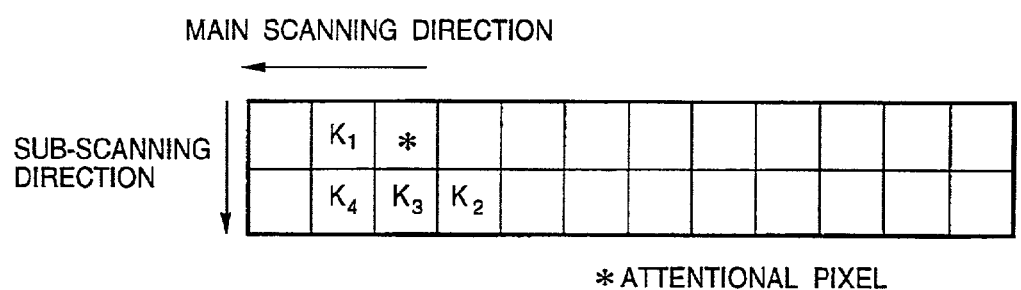
FIG. 10 is a diagram explaining a process of reversing a processing direction of error diffusion.

While the direction for processing one line is fixed in the present embodiment, it is also feasible to switch processing directions for each line alternately or in a predetermined order. In the case of performing the quantization process from right to left, the binarization error is distributed to the positions as shown in FIG. 10 where right and left positions in FIG. 8 are reversed.

Next, the method of creating the diffusion coefficient table 13 according to this embodiment will be described.

FIG. 11 shows all the candidate diffusion coefficients generated in a candidate diffusion coefficient generation unit 14, where "★" indicates the attentional pixel. For each gray level value, one coefficient is selected from all the candidate diffusion coefficients, and the selected coefficient is stored in the diffusion coefficient table 13.

Figure 12:
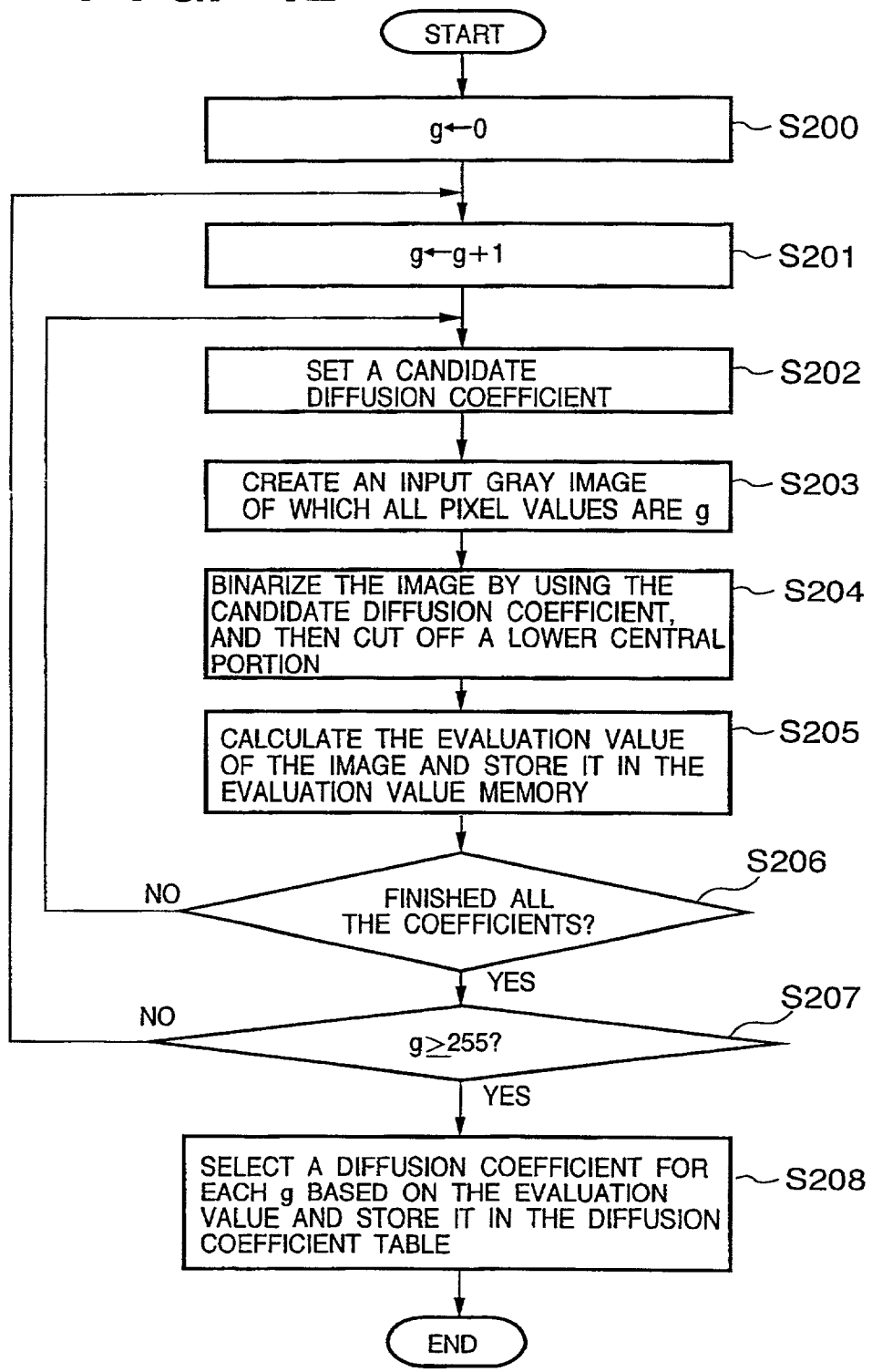
FIG. 12 is a diagram explaining how to create the diffusion coefficient table 13.

FIG. 12 is a flowchart showing a procedure for setting a diffusion coefficient in the embodiment of FIG. 1. First, the initial value of gray level value g is set to 0 (step S200). Thereafter, g is incremented (step S201).

Figure 13:
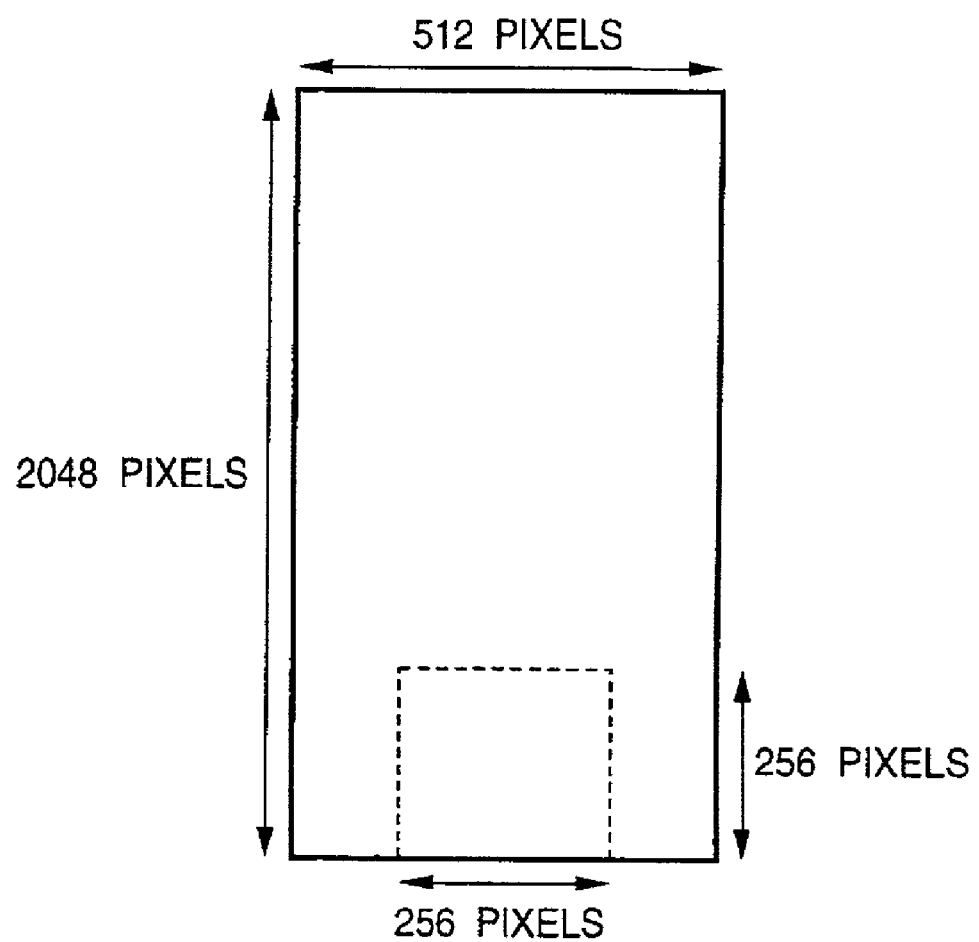
FIG. 13 is a diagram showing a subject portion of binary image evaluation.

Next, the following process is performed for all the candidate diffusion coefficients shown in FIG. 11. First, the candidate diffusion coefficient is set (step S202), and is stored in a position corresponding to g of the diffusion coefficient table. The input image of 512 pixels long and 128 pixels wide of which all pixel values are g is created (step S203), and this image data is binarized by the aforementioned method, and then a lower central portion equivalent to 256 pixels long and wide is cut off as shown in FIG. 13 (step S204).

For this binary image of 256 pixels long and wide, an image quality evaluation value is calculated by the method mentioned later. The evaluation value is then stored in the binary image evaluation value memory 17 (step S205). Thereafter, it is checked whether evaluation values for all of the candidate diffusion coefficients have been computed (step S206), and if not, the processing from the step S202 to the step S206 is repeated. If the evaluation values for all of the candidate diffusion coefficients have been computed, the gray level value g is compared with 255 (step S207). If g is smaller than 255, the processing from the step S201 to the step S207 is repeated.

If the value of g has reached 255 for each gray level value g, one diffusion coefficient is selected out of all the candidate diffusion coefficients by the method mentioned later based on the evaluation value stored in the binary image evaluation value memory 17. The selected coefficients are then stored in the diffusion coefficient table (step S208). Thereafter, it goes to END to complete the creation of diffusion coefficient table. In the case where the gray level value g is 0, the same diffusion coefficient as g=1 is stored in the diffusion coefficient table 13. Likewise in the case where the value of g is 255, the diffusion coefficient of g=254 is stored therein.

Figure 14:
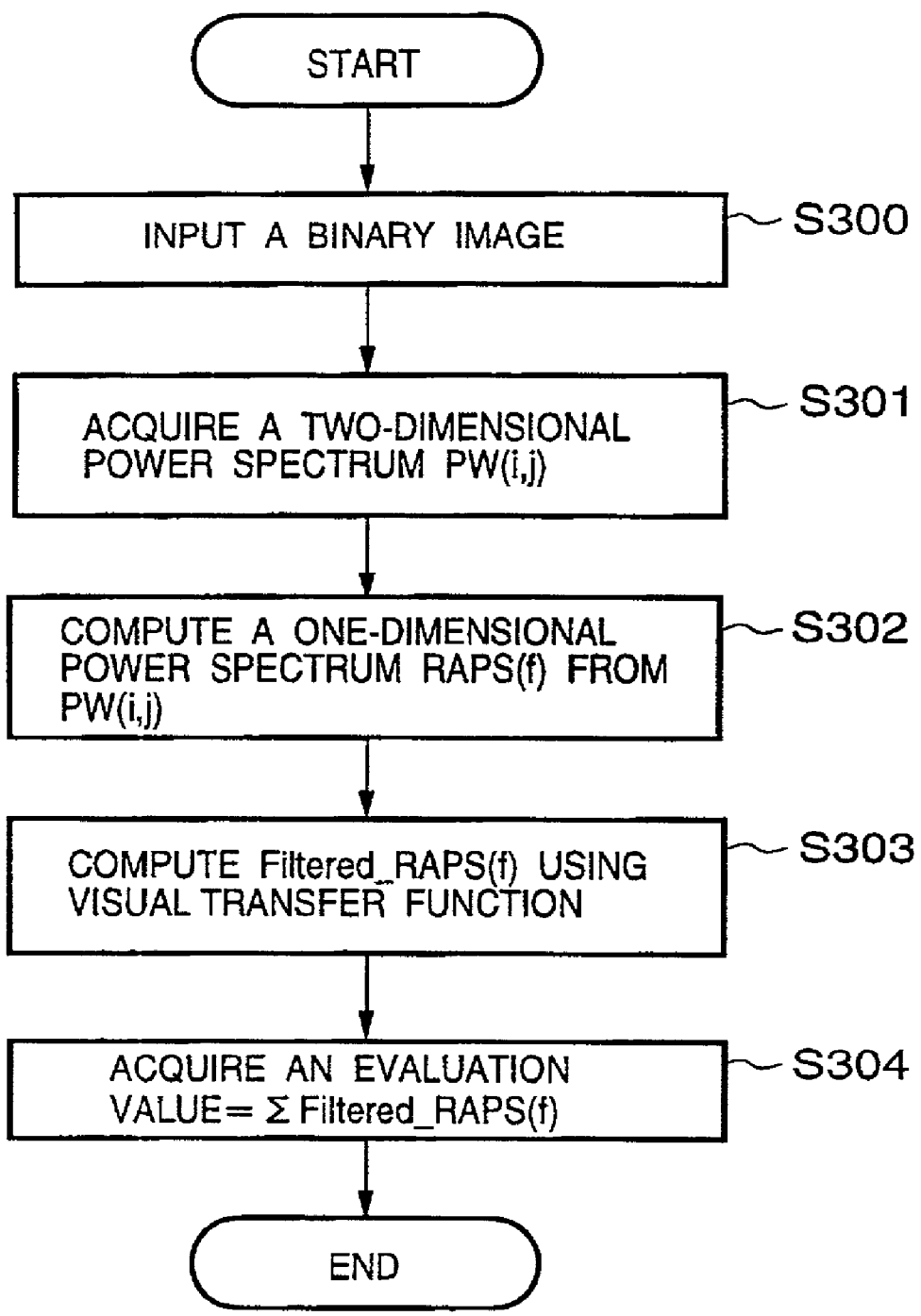
FIG. 14 is a flowchart showing a process of computing an evaluation value of a binary image.

Next, an evaluation value computing method in a binary image evaluation value computing unit 16 will be described. FIG. 14 is a flowchart showing a process of computing an evaluation value of a binary image in this embodiment.

Figure 15:
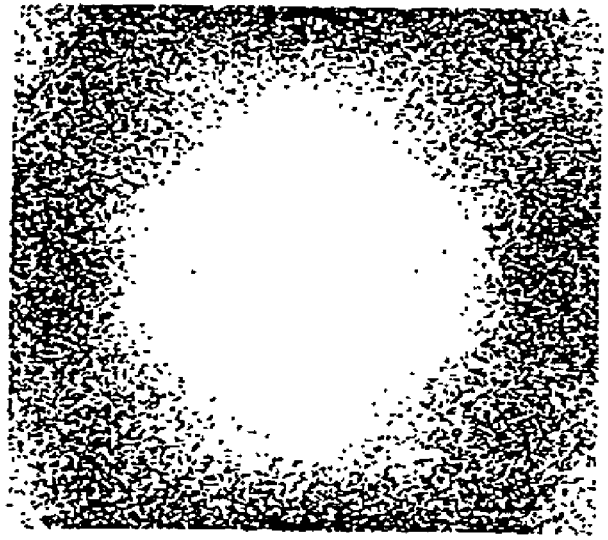
FIG. 15 is a diagram showing an example of a two-dimensional power spectrum.

First, the binary image created in the step 203 in FIG. 12 is read (step S300). Thereafter, two-dimensional Fourier transformation of this binary image is performed to acquire a two-dimensional power spectrum PW (i, j) (step S301). i, j are values in the range of −128 to 128, which indicate positions on the two-dimensional power spectrum. FIG. 15 shows an example of the two-dimensional power spectrum.

Figure 16:
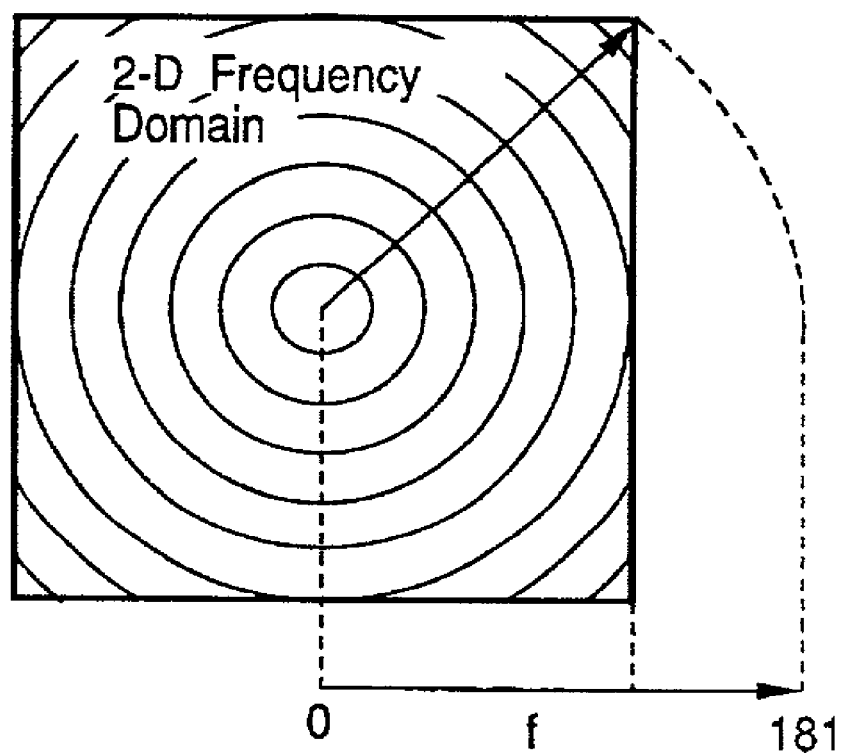
FIG. 16 is a diagram showing one-dimensionalization of a two-dimensional power spectrum.

This two-dimensional power spectrum of the binary image is then one-dimensionalized (step S302). As shown in FIG. 16, the two-dimensional power spectrum PW (i, j) is partitioned by concentric cycles to acquire an average value of the power spectrum for each frequency band f. Specifically, the value of the following equation is computed.

$$RAPS(f) = \frac{1}{N(f)} \sum_{l=1}^{N(f)} PW(i,j) \mid f = INT\sqrt{i^2 + j^2} \quad (2)$$

Figure 17:
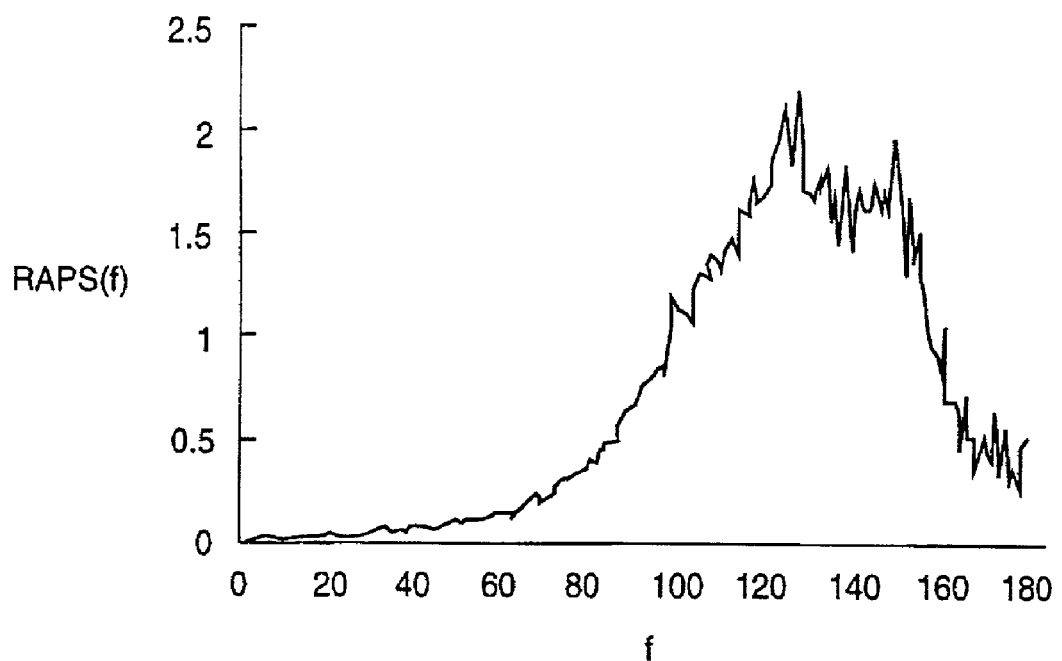
FIG. 17 is a diagram showing an example of a one-dimensional power spectrum.

INT represents rounding up of the fractional portion. Frequency f is an integer from 0 to 181, and N(f) is the number of pixel positions (i, j) satisfying $f=INT((i^2+j^2)^{(1/2)})$. FIG. 17 is an example of a graph of which horizontal axis is the frequency f and vertical axis is the power spectrum average value RAPS (f) in each cycle.

A visual transfer function (VTF) is then applied to the one-dimensionalized power spectrum RAPS(f) (step S303). The visual transfer runction used in this embodiment is represented by the following equation.

$$VTF(f') = \begin{cases} 5.05\exp(-0.138f')(1-\exp(-0.1f')) & f' > 5 \\ 1 & \text{else} \\ f' = \text{radial frequency (cycle/degree)} \end{cases} \quad (3)$$

Here, f' is a spatial frequency in cycles per degree. In the case where the observing distance is 300 mm and resolution of the binary image is 1,200 dpi, the above equation becomes as follows by converting f' into the aforementioned f.

$$VTF(f) = \begin{cases} 5.05\exp(-0.133f)(1-\exp(-0.096f)) & f > 5 \\ 1 & \text{else} \end{cases} \quad (4)$$

Figure 18:
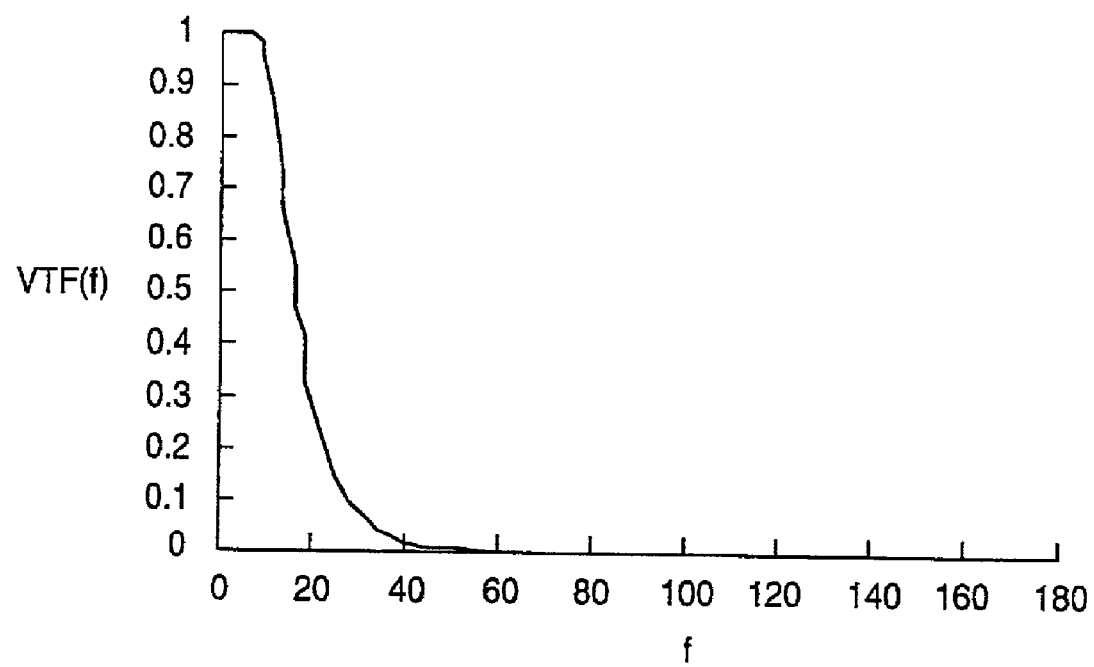
FIG. 18 is a diagram showing an example of a visual transfer function.

FIG. 18 is a graph of which horizontal axis is f and vertical axis is VTF(f).

The visual transfer function VTF(f) is applied to RAPS(f) to acquire Filtered_RA(f). Specifically, the following computation is performed to the values of f from 0 to 181.

$$\text{Filtered\_RA}(f) = VTF^2(f) \times RAPS(f) \quad 0 \leq f \leq 181 \quad (5)$$

The total sum of the filtered one-dimensional power spectrums (except DC component) Filtered_RAPS(f) is then computed to be the binary image evaluation value (step S304). Specifically, the value represented by the following equation is obtained to complete the binary image evaluation process.

Binary image evaluation value=

$$\sum_{f=1}^{181} \text{Filtered\_RAPS}(f) \quad (6)$$

Next, a diffusion coefficient selection method in the diffusion coefficient selection unit 18 will be described.

Figure 19:
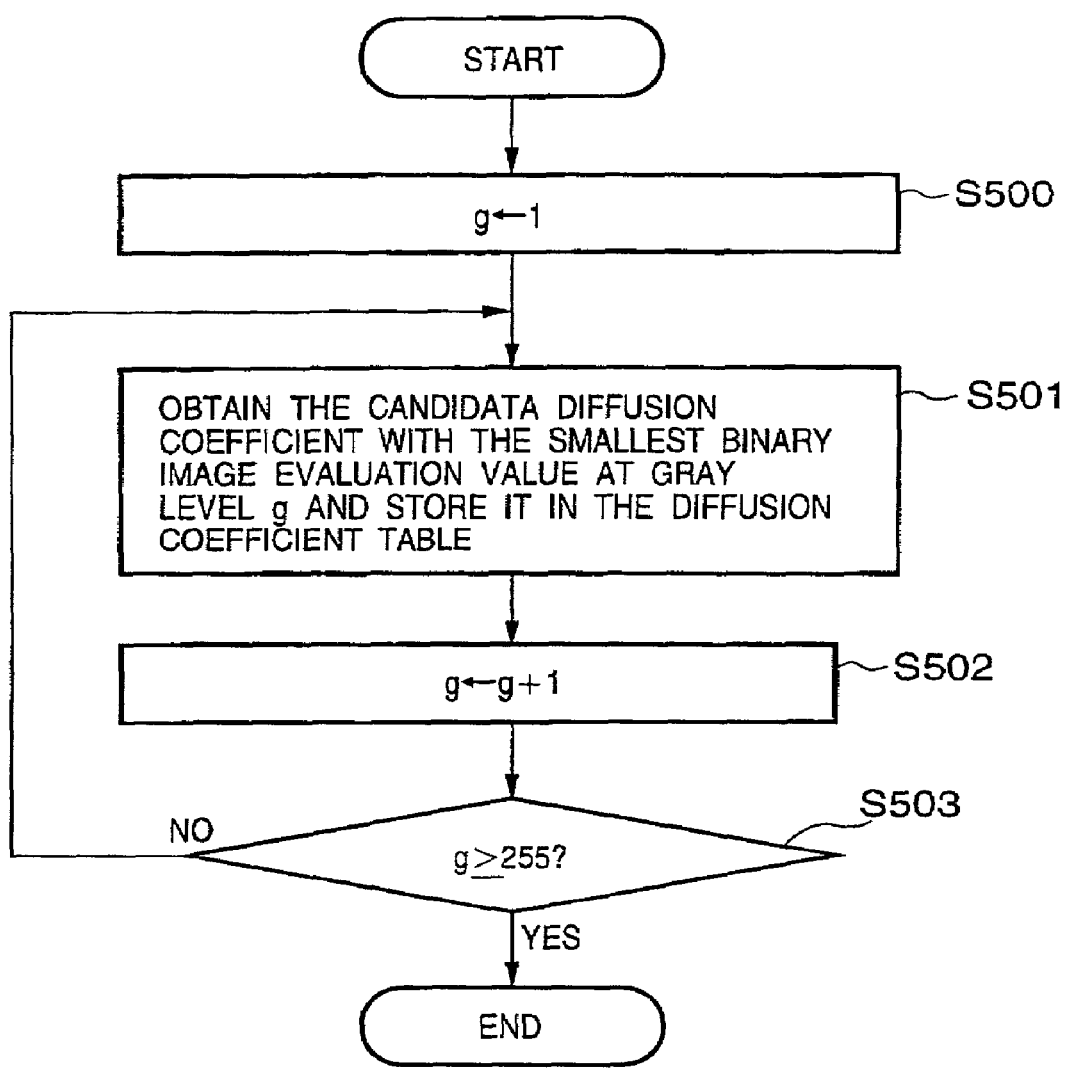
FIG. 19 is a flowchart showing selection of a diffusion coefficient in the first embodiment.

FIG. 19 is a flowchart showing a method of selecting a diffusion coefficient in this embodiment. First, the gray level value g is initialized to 1 (step S500). Next, the binary image evaluation values for all the candidate diffusion coefficients stored in the binary image evaluation value memory 17 are read, and the candidate diffusion coefficient with the smallest evaluation value is stored in the g-th position of the diffusion coefficient table 13 (step S501). The value of g is incremented (step S502), and g is compared with 255 (step S503). If g is smaller than 255, the steps S501 to S503 are repeated. If g has reached 255, this process is terminated.

Thus, according to the first embodiment, the diffusion coefficient on an error diffusion process is selected for each inputted level of gray scale by using an evaluation function. The evaluation function is based on the image which has been binarized by the density pattern method after a multivalued error diffusion was applied. Thus, it is possible to perform a binarization process optimized for each inputted level of gray scale including combination with density patterns.

Second Embodiment

In the first embodiment, only the evaluation data of an applicable level of gray scale is referred when determining the diffusion coefficient of each level of gray scale in the diffusion coefficient selection unit 18. In the second embodiment, the evaluation data of a plurality of levels of gray scale are referred when determining the diffusion coefficients.

Figure 20:
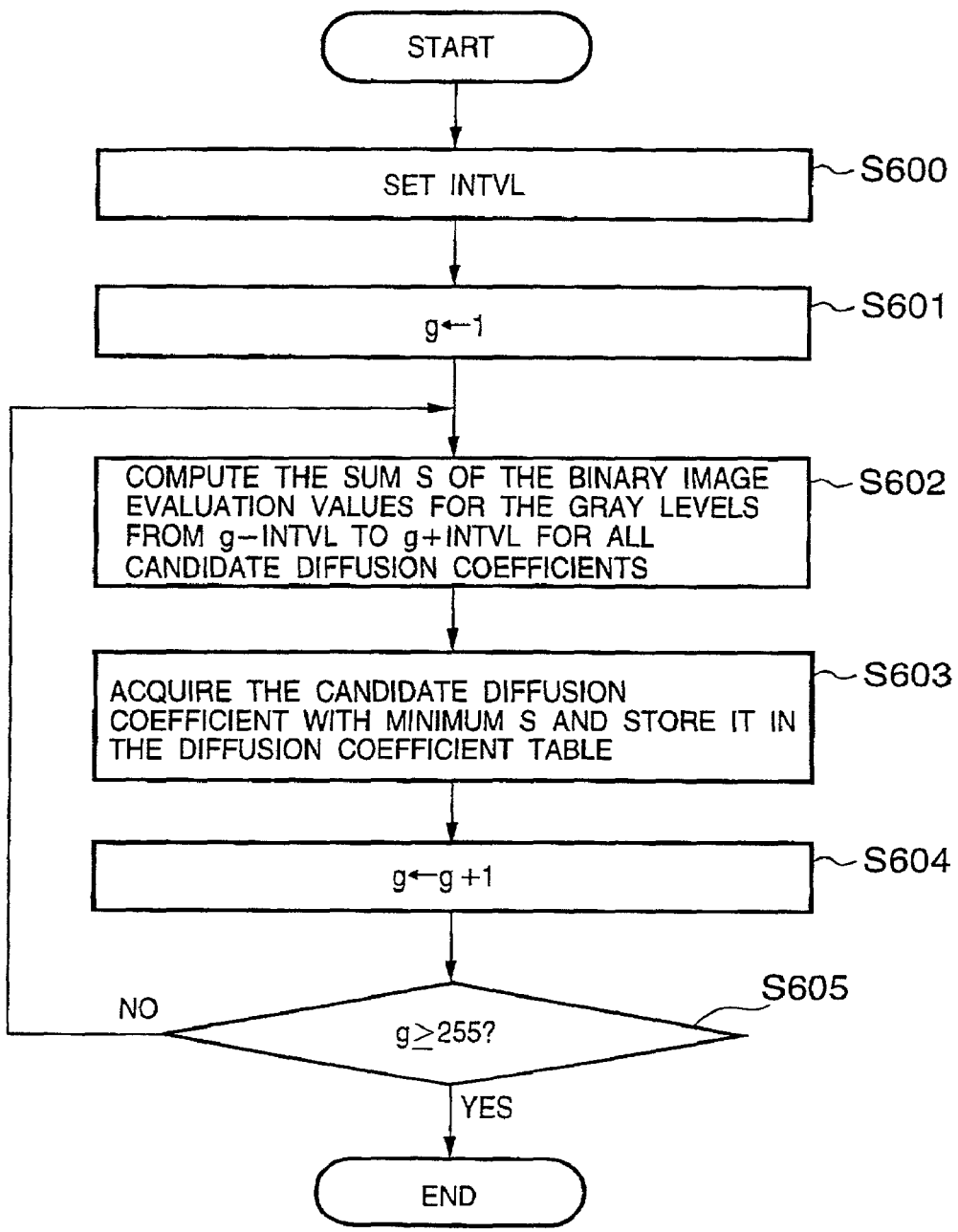
FIG. 20 is a flowchart showing selection of a diffusion coefficient in a second embodiment.

FIG. 20 is a flowchart showing a method of selecting the diffusion coefficient in this embodiment. First, a value INTVL showing an evaluation range is set (step S600). The value of INTVL is 4 in this embodiment. Next, gray level value g is initialized to 1 (step S601). Then, the binary image evaluation value stored in the binary image evaluation value memory 17 is read, and the sum S of the binary image evaluation values for the gray levels from g−INTVL to g+INTVL is computed for each candidate diffusion coefficient (step S602). In the case where g is smaller than INTVL, S is the sum of the evaluation values from gray levels 1 to g+INTVL. In the case where g is smaller than 255−INTVL, S is the sum of the evaluation values from gray levels g−INTVL to 254. Specifically, the value of the following equation is computed for each candidate coefficient.

$$S = \sum_{j=\min\_g}^{\max\_g} \text{Evaluation value at gray level} \quad (7)$$

$$\min\_g = \max(1, g - INTVL)$$

$$\max\_g = \min(254, g + INTVL)$$

Thereafter, the candidate diffusion coefficient with the minimum value of S is acquired, and is stored in the g-th position of the diffusion coefficient table 13 (step S603). The value of g is then incremented (step S604), and g is compared with 255 (step S605). If g is smaller than 255, the steps from S602 to S603 are repeated. If g has reached 255, this process is terminated.

Thus, according to the second embodiment, binarized image evaluation values at not only one level of gray scale but also the adjacent levels of gray scale are taken in account. Hence, the coefficient to be selected does not change greatly at each level of gray scale. Thus, binarization of an image with smooth gray level change becomes possible.

As described above, the image processing apparatus and method according to the first and second embodiments yield good binarization results at all gray levels by using an optimum diffusion coefficient at each gray level.

Third Embodiment

Figure 21:
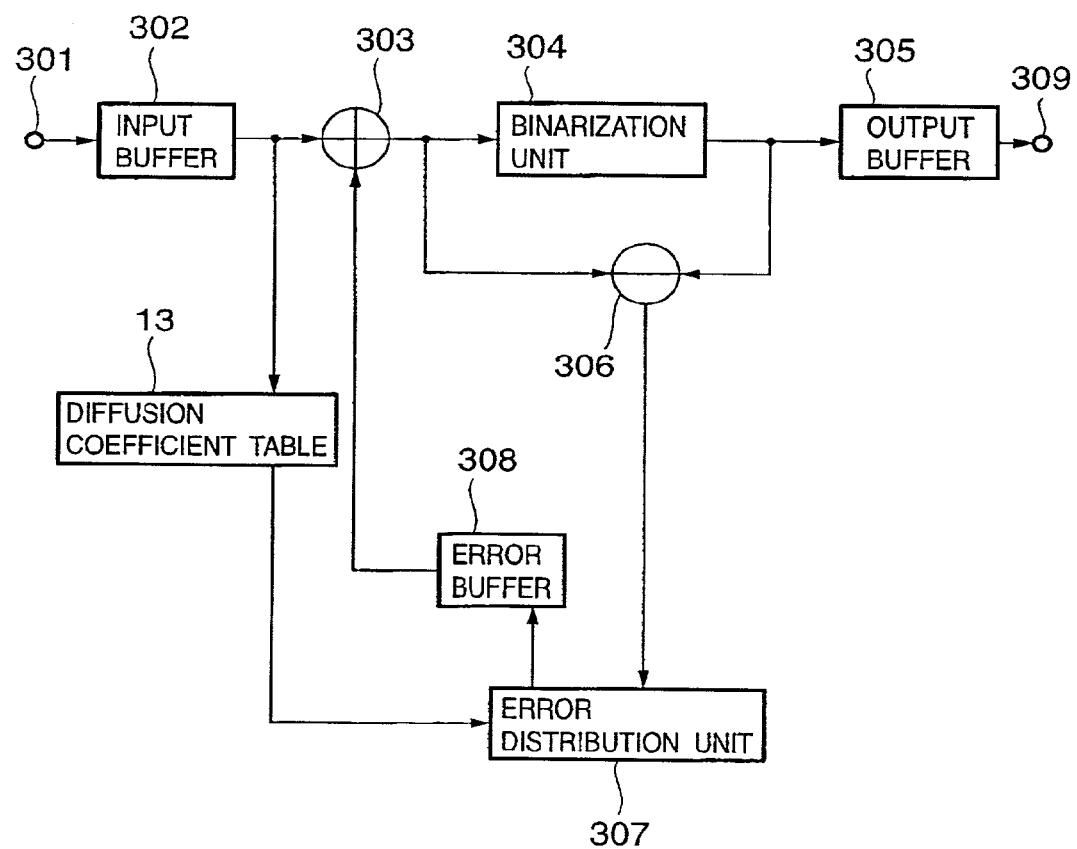
FIG. 21 is a block diagram showing detailed configuration of the image binarization unit 12 in a third embodiment.

Configuration of the image processing apparatus according to a third embodiment will be described hereafter. Description will be omitted as to the drawings in common with those described in the first embodiment. FIG. 21 is a block diagram showing detailed configuration of the image binarization unit 12 shown in FIG. 1. In this diagram, reference numeral 301 denotes a data input terminal, which reads 8-bit input image having the pixel values in the range of 0 to 255. Reference numeral 302 denotes an input buffer, which stores the pixel values equivalent to a line of the input image. Reference numeral 303 denotes an input correction unit, which adds cumulative errors from processed pixels to a pixel of the input image. Reference numeral 304 denotes a binarization unit, which binarizes the pixel values of the input image corrected in the input correction unit 303 based on a predetermined threshold. Reference numeral 305 denotes an output buffer, which stores the data equivalent to one line binarized in the binarization unit 304. Reference numeral 306 denotes a difference computing unit, which computes a binarization error against the attentional pixel. Reference numeral 307 denotes an error distribution unit, which diffuses the binarization error computed by the difference computing unit 306 to the surrounding pixels. Reference numeral 308 denotes an error buffer, which is a RAM for storing the error diffused to the pixels surrounding the attentional pixel. Reference numeral 309 denotes an output terminal of a binary signal of an output level 0 or 255.

The above-mentioned input image refers to the multivalued image data of which each pixel is 8-bit and has a value in the range of 0 to 255. In addition, a horizontal size (number of pixels) W and a vertical size H of the input image are specified by an unillustrated method.

FIG. 22 is a diagram showing configuration of the input buffer 302 in the third embodiment. The value in each box is the pixel value of the input image, where the value can be any integer between 0 and 255.

Figure 23:
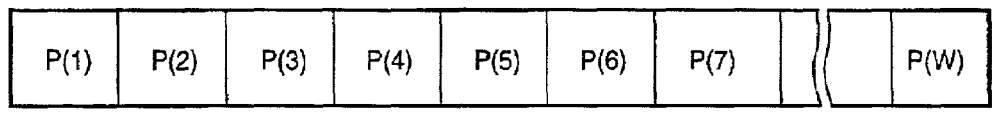
FIG. 23 is a diagram showing configuration of an output buffer 305 according to the third embodiment.

FIG. 23 is a diagram showing configuration of the output buffer 305 in the third embodiment. The value in each box is the data to be outputted, where the value is either "0" or "255".

Figure 24:
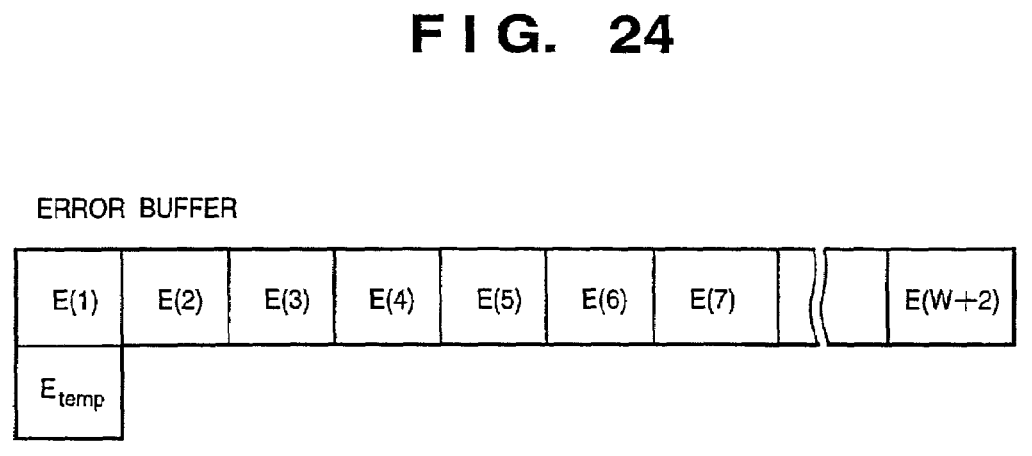

FIG. 24 is a diagram showing configuration of the error buffer 308 according to the third embodiment. The value in each box is the cumulative errors from already processed pixels, where the value is a real number in the range of −255 to 255. In addition, the error buffer 308 has a margin of two pixels over the horizontal size W of the input image to cope with line end processing.

A process of converting a multivalued input image into a binary image by the image processing apparatus of the above configuration will be described.

Figure 25:
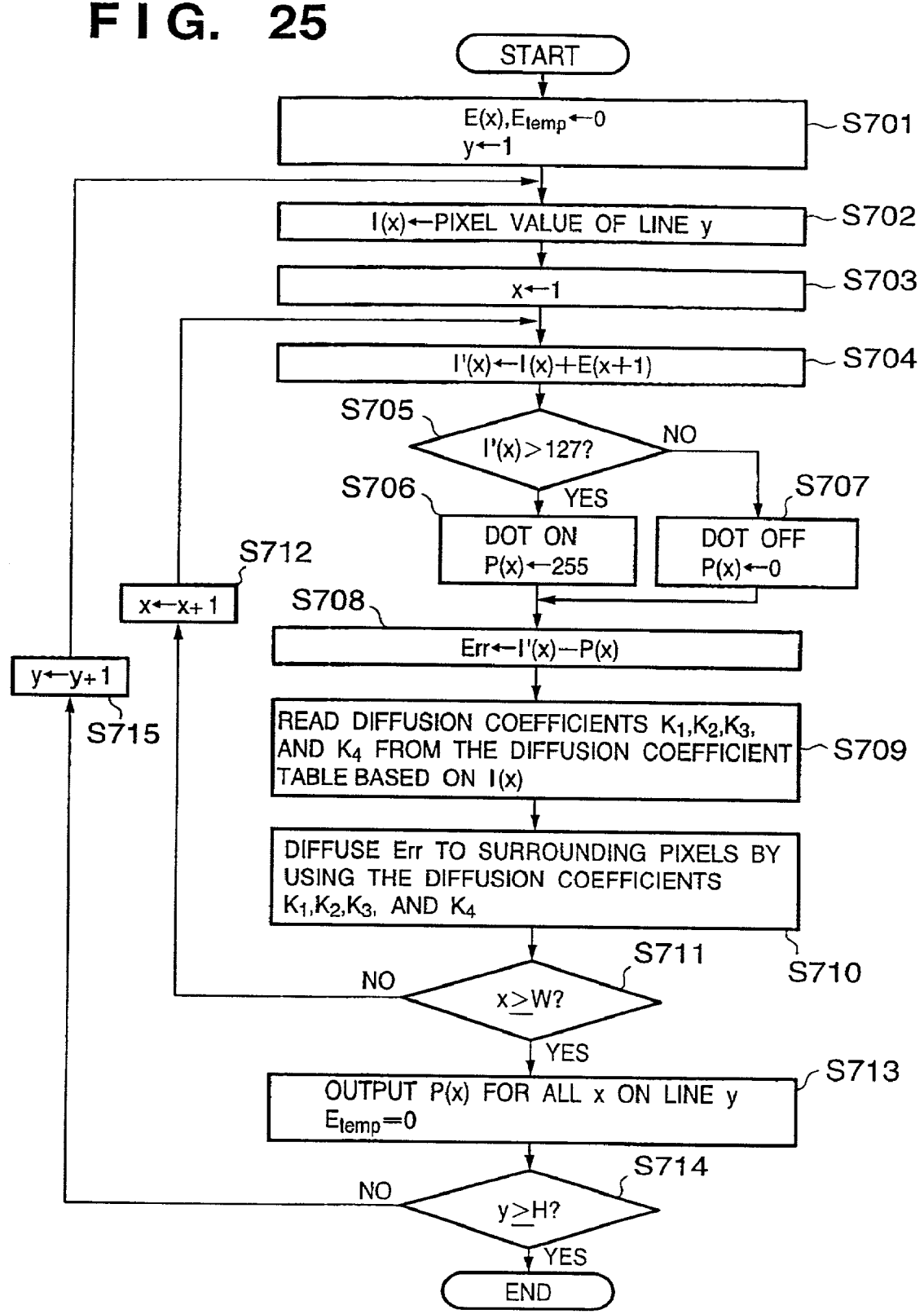
FIG. 25 is a flowchart showing a procedure for converting an input multivalued image into a binary image according to the third embodiment.

FIG. 25 is a flowchart showing a procedure for converting an input multivalued image into a binary image according to the third embodiment. This flowchart calls the line number in sub-scanning direction y and the dot number in main scanning direction x, where a binarization process is performed from the upper left corner to the lower right of the image.

First, the line number y is initialized to 1, and the error buffer 308 shown in FIG. 24 is initialized to 0 (step S701). To be more specific, the values from E (1) to E (W+2) and $E_{temp}$ of this error buffer 308 are set to 0.

Next, the pixel value data on the y-th line is read into the input buffer 302 (step S702). Specifically, the input data of the x-th dot on the y-th line is assigned to I (x) for x=1 to x=W.

After reading the input data equivalent to one line, the pixel position x is set at the initial value of 1 (step S703). The diffusion error E (x+1) from a processed pixel mentioned later is then added to the x-th input value I (x) to obtain the corrected value I' (x) (step S704). This corrected value I' (x) is compared with the threshold 127 (step S705); if I' (x) is larger than the threshold 127, "255" is assigned to the output value P (x) (step S706), and if not larger, P (x) is set to "0" (step S707). The binarization error Err is the obtained by computing the difference between the corrected value I' (x) of the attentional pixel and the output value P (x)(step S708).

Figure 26:
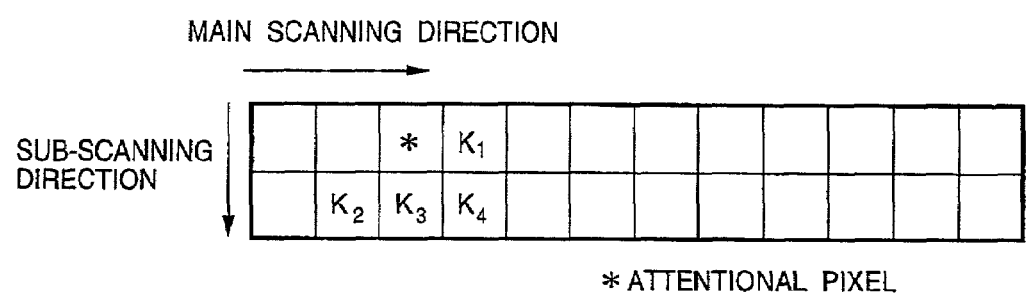
FIG. 26 is a diagram for explaining error diffusion.

Next, this binarization error Err is distributed to the surrounding pixels. The weight assignment (the diffusion coefficient) for this distribution process depends on the input value I (x). First, the diffusion coefficient corresponding to the input value I (x) is read from the diffusion coefficient table 13 (step S709), and the binarization error Err is distributed to the surrounding pixels according to the weight assignment. In this embodiment, the diffusion coefficients $K_1$, $K_2$, $K_3$ and $K_4$ are read from the diffusion coefficient table 13 shown in FIG. 2, and the binarization error Err is distributed to unprocessed pixels surrounding the attentional pixel as shown in FIG. 26. The distributed binarization error Err is stored in the error buffer 308 as follows (step S710).

$$\left.\begin{aligned} E(x+2) &= E(x+2) + K_1 \cdot Err \\ E(x) &= E(x) + K_2 \cdot Err \\ E(x+1) &= E_{temp} + K_3 \cdot Err \\ E_{temp} &= K_4 \cdot Err \end{aligned}\right\} \quad (8)$$

Next, it is determined whether or not the attentional pixel position x has reached the end of line (step S711). If it has not reached the end, the attentional pixel is moved by one in the direction of the main scanning (step S712), and the processing from the step S704 to the step S711 is repeated. If the pixel position has reached the end of line, the output value from P (1) to P (W) are outputted, and $E_{temp}$ is reset to "0" (step S713). It is determined thereafter whether or not the line number y has reached the maximum value H (step S714). If y is smaller than H, the line number y is incremented (step S715), and the processing from the step S702 to the step S714 is repeated. If y has reached H, this process is terminated.

While the direction for processing one line is fixed in this embodiment, it is also feasible to switch processing directions for each line alternately or in a predetermined order. For instance, in the case of performing the binarization process from right to left, the binarization error can be distributed to the positions where the right and left positions of the diffusion coefficients in FIG. 26 are reversed as in FIG. 27.

Next, the method of creating the diffusion coefficient table 13 according to this embodiment will be described.

In this embodiment, all the candidate diffusion coefficients as shown in FIG. 11 are generated by the candidate diffusion coefficient generation unit 14 just as in the first embodiment, where, for each gray level, one coefficient is selected from all the candidate diffusion coefficients and is stored in the above-mentioned diffusion coefficient table 13.

Figure 28:
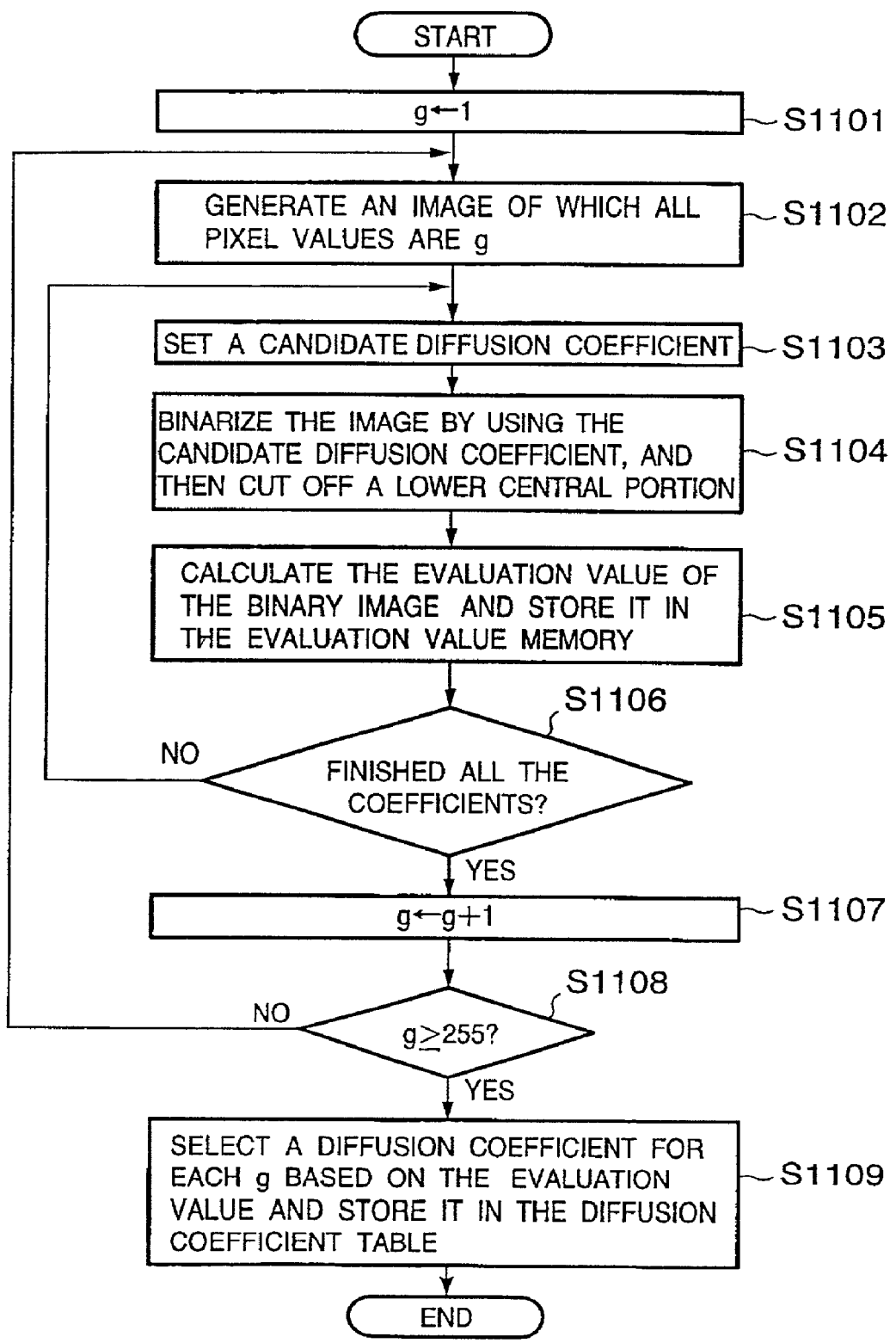
FIG. 28 is a flowchart showing a process of setting a diffusion coefficient according to the third embodiment.

FIG. 28 is a flowchart showing a process of setting a diffusion coefficient according to the third embodiment. First, the initial value of a gray level value g is set to 1 (step S1101), and then the input image of 2048 pixels long and 512 pixels wide of which all pixel values are g is generated (step S1102).

Next, the following process is performed for all the candidate diffusion coefficients shown in FIG. 11. First, the candidate diffusion coefficient is set (step S1103), and is stored in a position corresponding to g of the diffusion coefficient table 13. The generated input image is binarized by the aforementioned method, and then a lower central portion equivalent to 256 pixels long and wide is cut off the binary image as shown in FIG. 13 (step S1104).

Next, the image quality evaluation value of this binary image of 256 pixels long and wide is calculated by a method mentioned in detail later (step S1105). The evaluation value is stored in the binary image evaluation value memory 17. Thereafter, it is checked whether evaluation values for all of the candidate diffusion coefficients have been computed (step S1106), and if not, the processing from the step S1103 to the step S1106 is repeated.

If the evaluation values have been computed for all of the candidate diffusion coefficients, the gray level value g is incremented (step S1107), and then the value of g is compared with 255 (step S1108). If the value of g is smaller than 255, the steps from S1102 to S1108 is repeated. If the value of g has reached 255, for each gray level value g, one diffusion coefficient is selected out of all the candidate diffusion coefficients by the method mentioned in detail later based on the evaluation value stored in the image evaluation value memory 108. The selected coefficients are then stored in the diffusion coefficient table 13 (step S1109), and the above-mentioned process of creating the diffusion coefficient table is finished.

While the above-mentioned process does not create a diffusion coefficient in the cases where the gray level value g is "0" or "255", the diffusion coefficient of g=1 is stored in the diffusion coefficient table 13 in the case where the gray level value g is 0. Likewise, the diffusion coefficient of g=254 is stored therein in the case where the value of g is 255.

Next, the evaluation value computing method in the image evaluation value computing unit 16 (FIG. 1) will be described.

Figure 29:
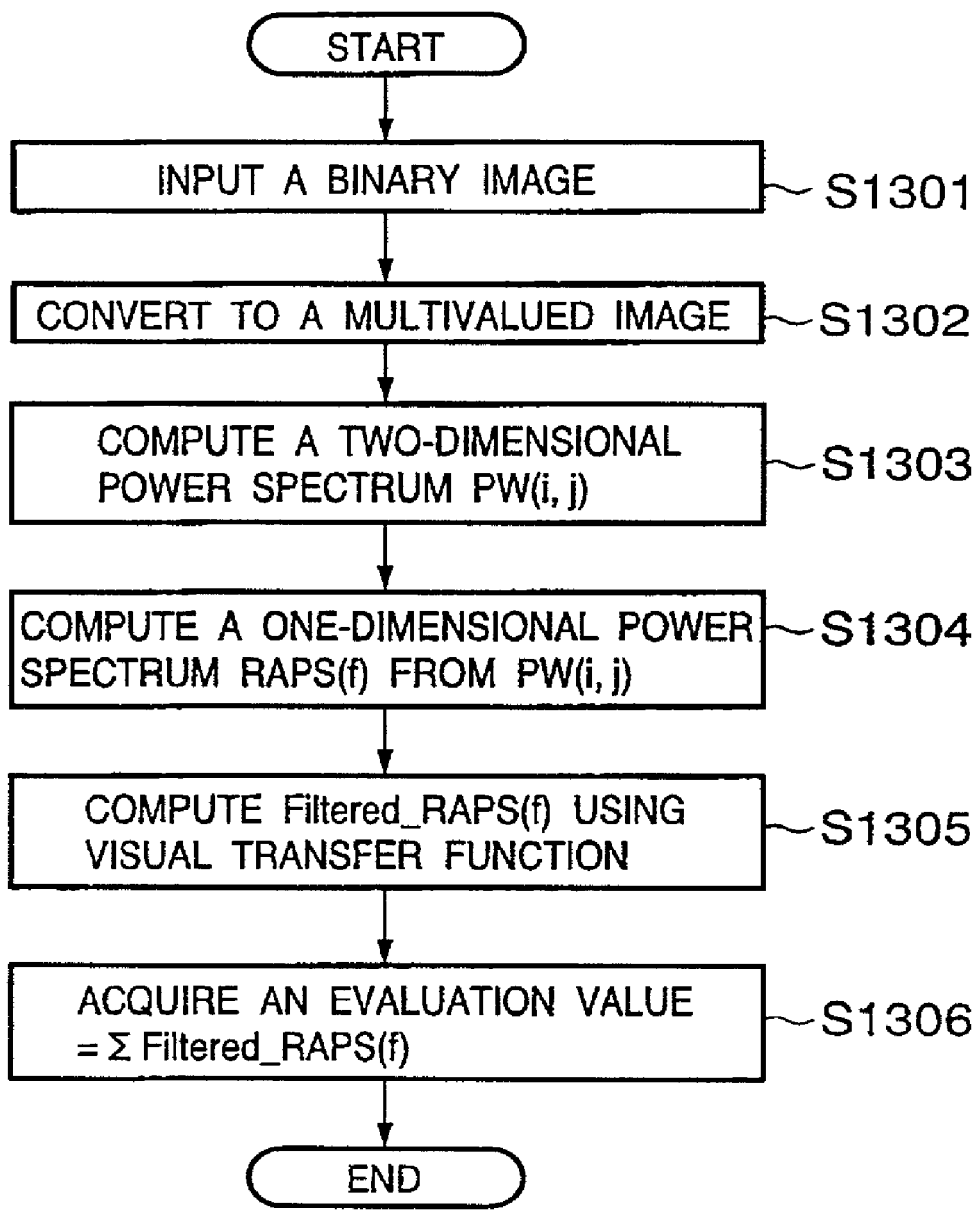
FIG. 29 is a flowchart showing the computing process of the evaluation value of a binary image according to the third embodiment.

FIG. 29 is a flowchart showing a process of computing an evaluation value of a binary image in the third embodiment. First, the binary image created by using a candidate diffusion coefficient in the step S1104 of FIG. 28 is read (step S1301). This binary image is converted into a multivalued image by a method mentioned in detail later in order to allow for overlapping of ink on a real printer (step S1302).

Figure 30:
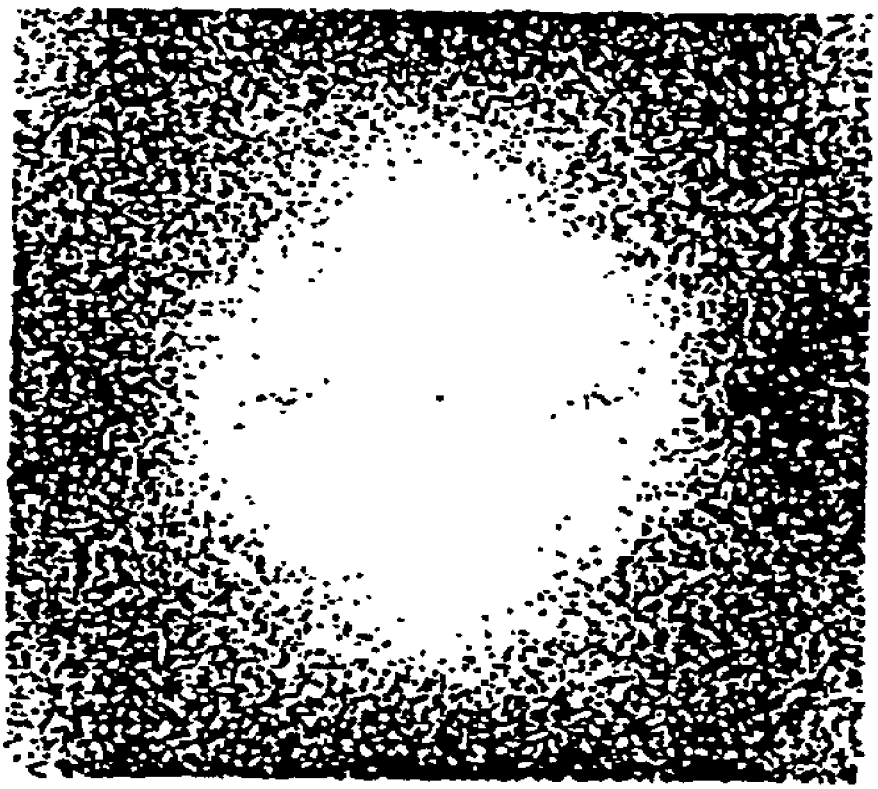
FIG. 30 is a diagram showing an example of a two-dimensional power spectrum.

Thereafter, two-dimensional Fourier transformation of the multivalued image is performed to acquire a two-dimensional power spectrum PW (i, j) (step S1303). Here, i, j are values in the range of −128 to 128, which indicate positions on the two-dimensional power spectrum. FIG. 30 shows an example of the two-dimensional power spectrum.

Next, this two-dimensional power spectrum of the binary image is one-dimensionalized (step S1304). As shown in FIG. 16, the two-dimensional power spectrum PW (i, j) is partitioned by concentric cycles to acquire an average value of the power spectrum for each frequency band f. Specifically, it is acquired by the equation (2) shown in the first embodiment.

Figure 31:
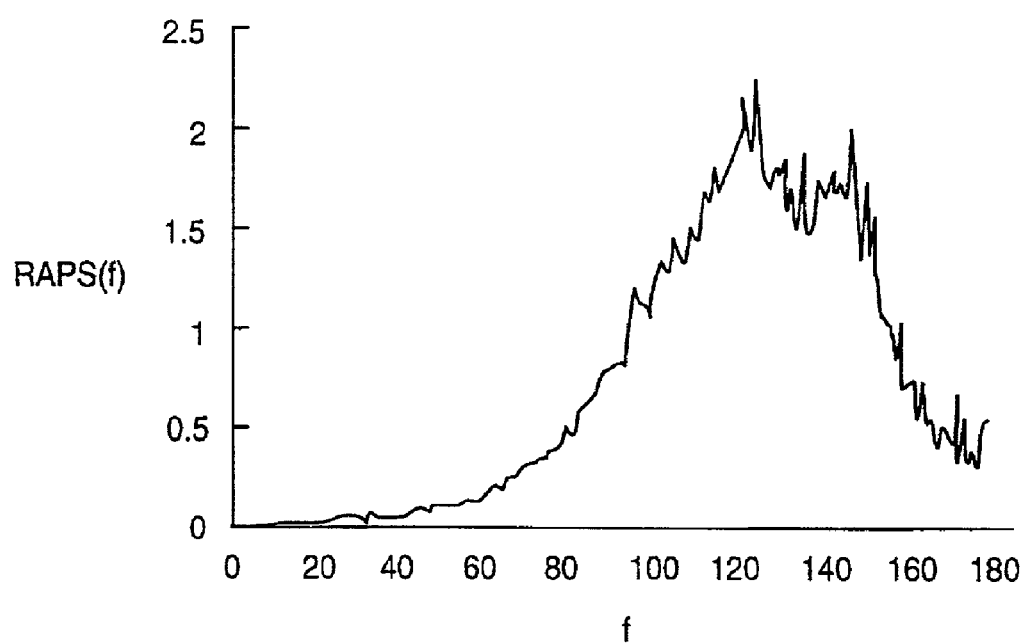
FIG. 31 is a diagram showing an example of a one-dimensional power spectrum.

FIG. 31 is an example of a graph of which horizontal axis is the frequency f and vertical axis is a power spectrum average value RAPS (f) in each cycle.

Next, the visual transfer function (VTF) is applied to the one-dimensionalized power spectrum RAPS (f) (step S1305). The visual transfer function used in this embodiment is represented by the equation (3) shown in the first embodiment. In the case where an observation distance is 300 mm and resolution of the binary image is set at 1,200 dpi, the equation (3) is given as the equation (4) by converting f' into the aforementioned f.

Next, the visual transfer function VTF (f) is applied to RAPS (f) to acquire Filtered_RAPS(f). Specifically, the following computation is performed as to the value of the frequency f from 0 to 181.

$$\text{Filtered\_RAPS}(f) = VTF^2(f) \times RAPS(f) \quad 0 \leq f \leq 181 \quad (9)$$

The total sum of the filtered one-dimensional power spectrums Filtered_RAPS(f) is then computed to be the binary image evaluation value (step S1305). Specifically, the value represented by the above equation (6) is obtained to complete the image evaluation process.

Next, a process of converting the binary image into the multivalued image to allow for overlapping of the dots will be described.

Figure 32:
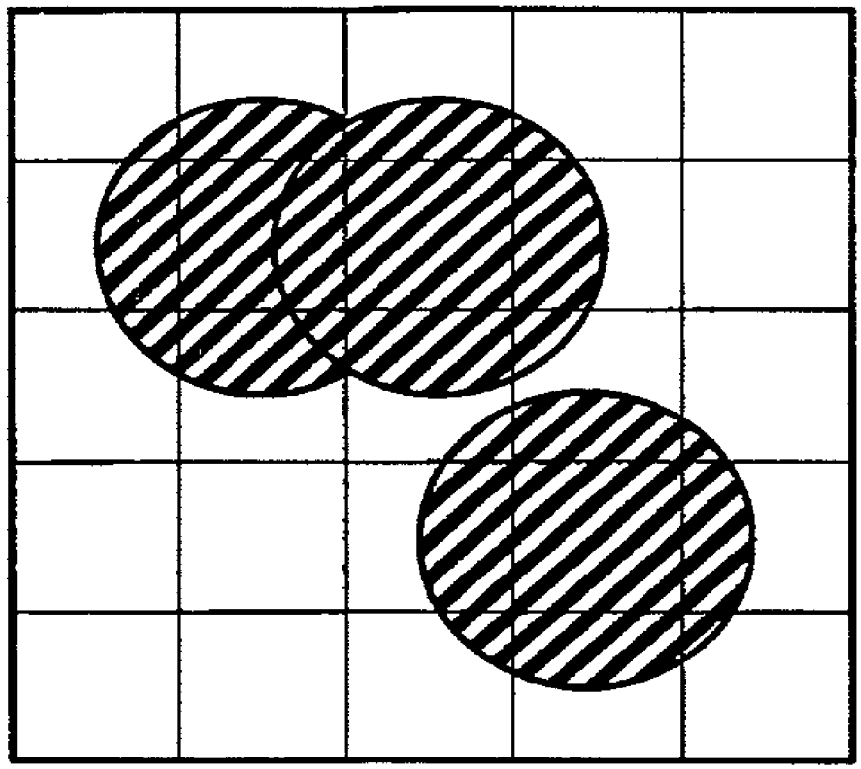
FIG. 32 is a diagram showing overlap and displacement of ink dots on paper.
Figure 33:
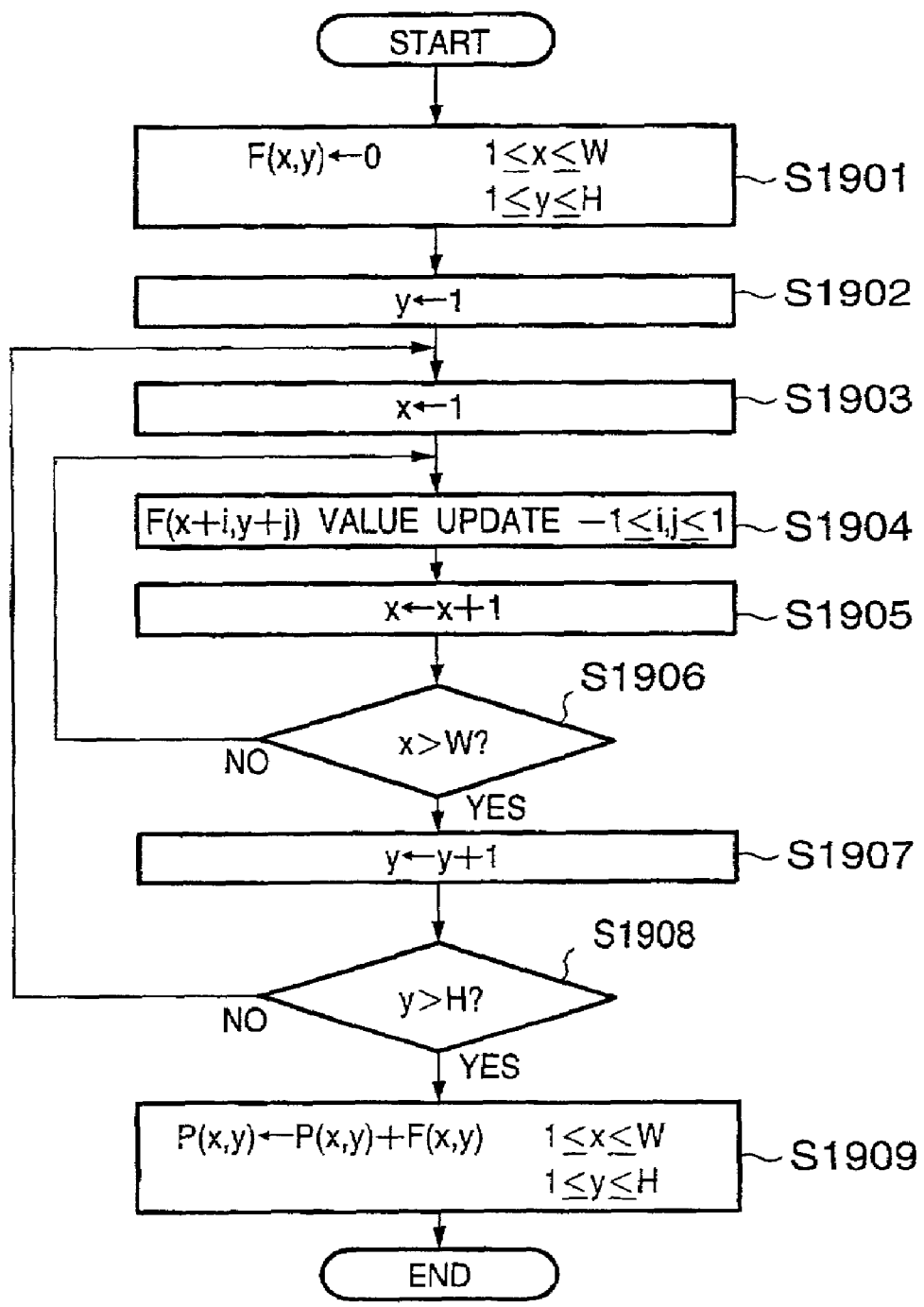
FIG. 33 is a flowchart showing a process of creating a multivalued image from a binary image according to the third embodiment.

FIG. 32 is a diagram illustrating the dots formed on paper overlapping on the adjacent dot areas. FIG. 33 is a flowchart showing a process of creating a multivalued image from the binary image according to the third embodiment.

First, for all the pixel positions x, y, a density correction value F (x, y) due to overlapping on the adjacent dot area is initialized to "0" (step S1901).

Next, the sub-scanning direction line number y of the input binary image is initialized to "1" (step S1902), and the main scanning direction dot number x of the input binary image is initialized to "1" (step S1903). Then, the pixel value P (x, y) at the position (x, y) of the input binary image is read, and the value of F (x+i, y+j) is updated using the following equation (step S1904).

$$F(x+i, y+j) = F(x+i, y+j) + P(x, y) \times C_{i,j} \times \left(\frac{D_2}{D_1} - 1\right) \quad (10)$$

$$-1 \leq i, j \leq 1$$

Figure 34:
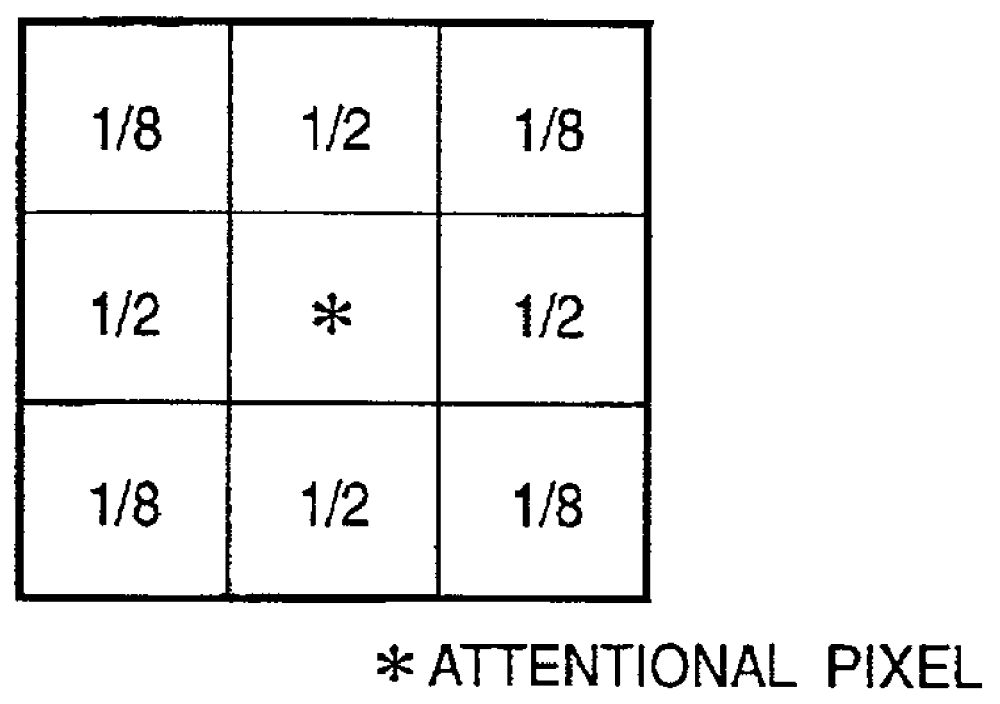

Here, $C_{ij}$ is the ratio of the area that the overlapping portion of the attentional dot occupies in the area of the adjacent dot. In addition, $D_1$ is the density of the dot of which reference is white of the paper, and $D_2$ is the density of the dot superimposed. FIG. 34 shows an example of $C_{ij}$.

Thereafter, the dot number x is incremented (step S1905), and x is compared with the horizontal size W of the input binary image (step S1906). If x does not exceed W, the density correction value update process from the step S1904 to the step S1906 is repeated. If x is larger than W, y is incremented in order to process the next line (step S1907), and y is compared with the vertical size H of the input binary image. If y has not reached H, the step S1903 to the step S1908 are repeated. If y is larger than H, for every pixel of the input binary image, the density correction value F (x, y) is added to the corresponding pixel values P (x, y)(step S1909) to complete the process of converting the binary image into the multivalued image.

Next, the diffusion coefficient selection method in the diffusion coefficient selection unit 18 (FIG. 1) will be described.

Figure 35:
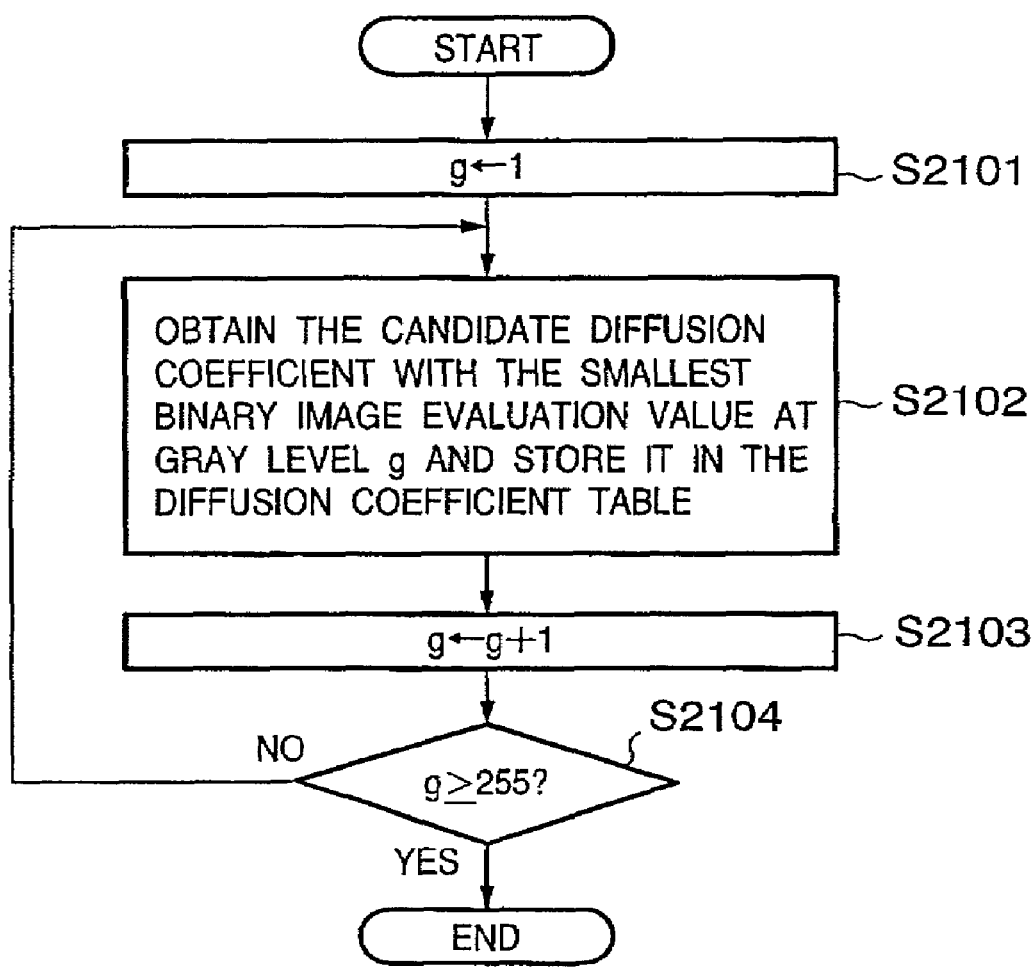
FIG. 35 is a flowchart showing a selection process of a diffusion coefficient according to the third embodiment.

FIG. 35 is a flowchart showing a process of selecting a diffusion coefficient in the third embodiment. First, the gray level value g is initialized to 1 (step S2101). Next, the binary image evaluation values for all the candidate diffusion coefficients stored in the image evaluation value memory 108 are read, and the candidate diffusion coefficient with the smallest evaluation value is stored in the g-th position of the diffusion coefficient table 104 (step S2102). The value of g is then incremented (step S2103), and is compared with 255 (step S2104). If the value of g is smaller than 255, the processing of the steps S2102 to S2104 is repeated. If the value of g has reached 255, this process is terminated.

According to the third embodiment, the diffusion coefficient is selected for each inputted level of gray scale by using the image evaluation function; hence it is possible to perform a binarization process suited to each level of gray scale.

Fourth Embodiment

In the third embodiment, the input binary image is converted into the multivalued image of the same size in the image evaluation value computing process in order to allow for the change in density due to deviation of the dots. In the present embodiment, the input binary image is converted into a multivalued image of larger size, where a single dot in the input image is approximated by a plurality of pixels.

Figure 36:
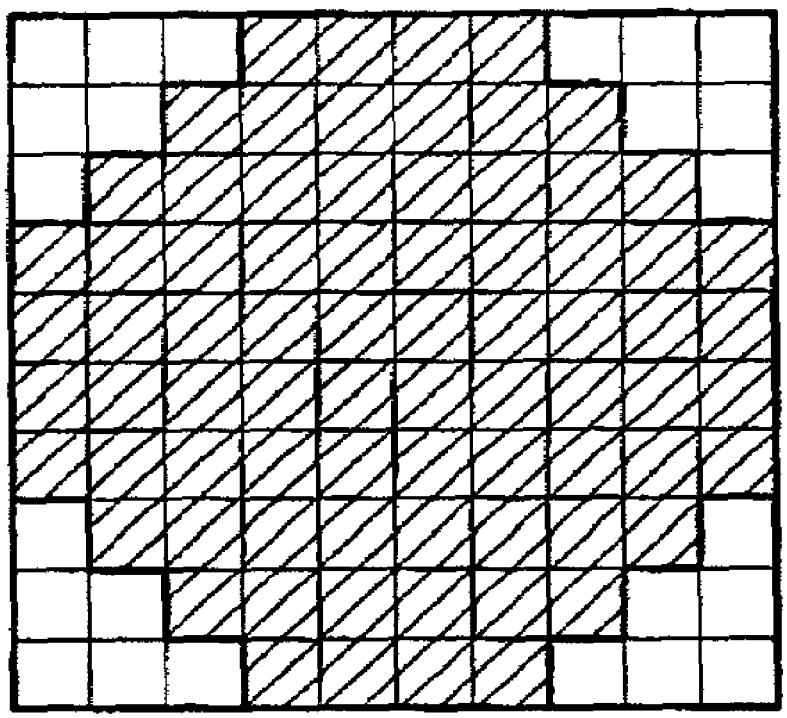
FIG. 36 is a diagram showing an example of approximating a dot according to a fourth embodiment by using a plurality of dots.

FIG. 36 shows an example of approximating a dot of a complete round by using a plurality of pixels. It represents deviation of the output dot and overlapping of a plurality of dots by rendering the distance between the adjacent dots smaller than a dot diameter.

Figure 37B:
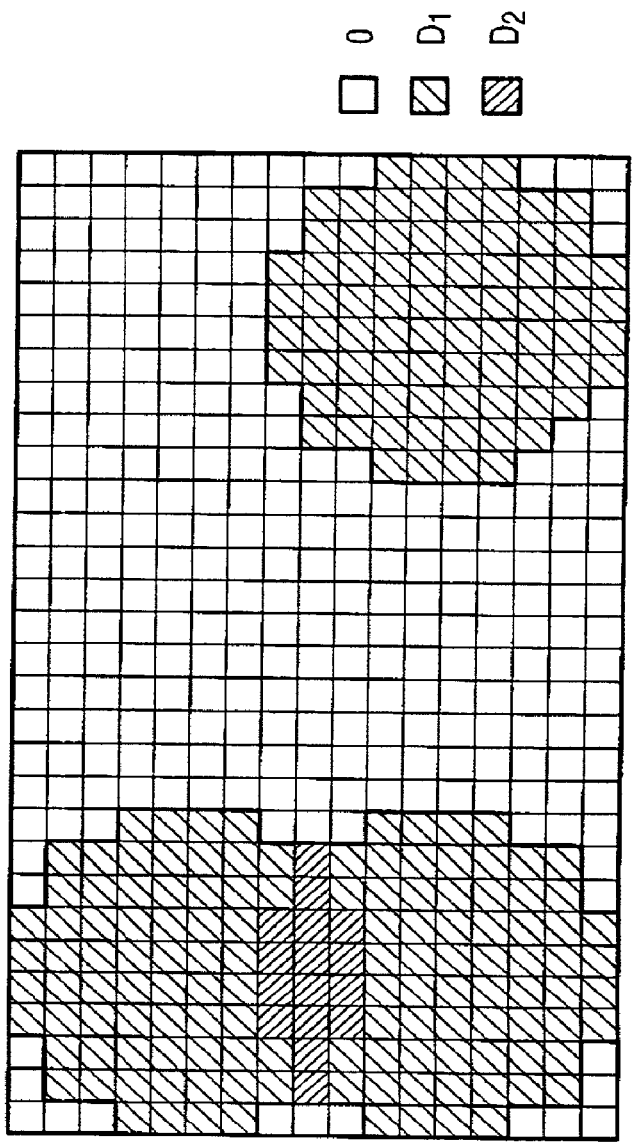
Figure 37A:
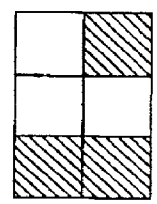
FIGS. 37A and B are diagrams showing conversion from an input binary image to a multivalued image according to the fourth embodiment, where

FIGS. 37 are diagrams showing conversion from the input binary image to the multivalued image according to the fourth embodiment. FIG. 37A shows the input binary image, and FIG. 37B shows the converted multivalued image. In addition, $D_1$ is the density with reference to paper white when it is dotted once, and $D_2$ is the value corresponding to the density when a plurality of dots are overlapping. Thus, the processing from the aforementioned steps S1303 to S1306 shown in FIG. 29 is performed to the multivalued image converted from the input binary image in order to obtain the image evaluation value.

According to the fourth embodiment, it is possible to evaluate the image data closer to a printer output image since the output 1 dot is represented by using a plurality of pixels.

Fifth Embodiment

While the binary image is converted into the multivalued image in order to allow for ink overlapping and change of the density due to deviation of the dots on the real printer in the process of acquiring the evaluation value of the binary image shown in FIG. 29 in the aforementioned third and fourth embodiments, it is also possible to acquire the evaluation value of the binary image as-is.

Figure 38:
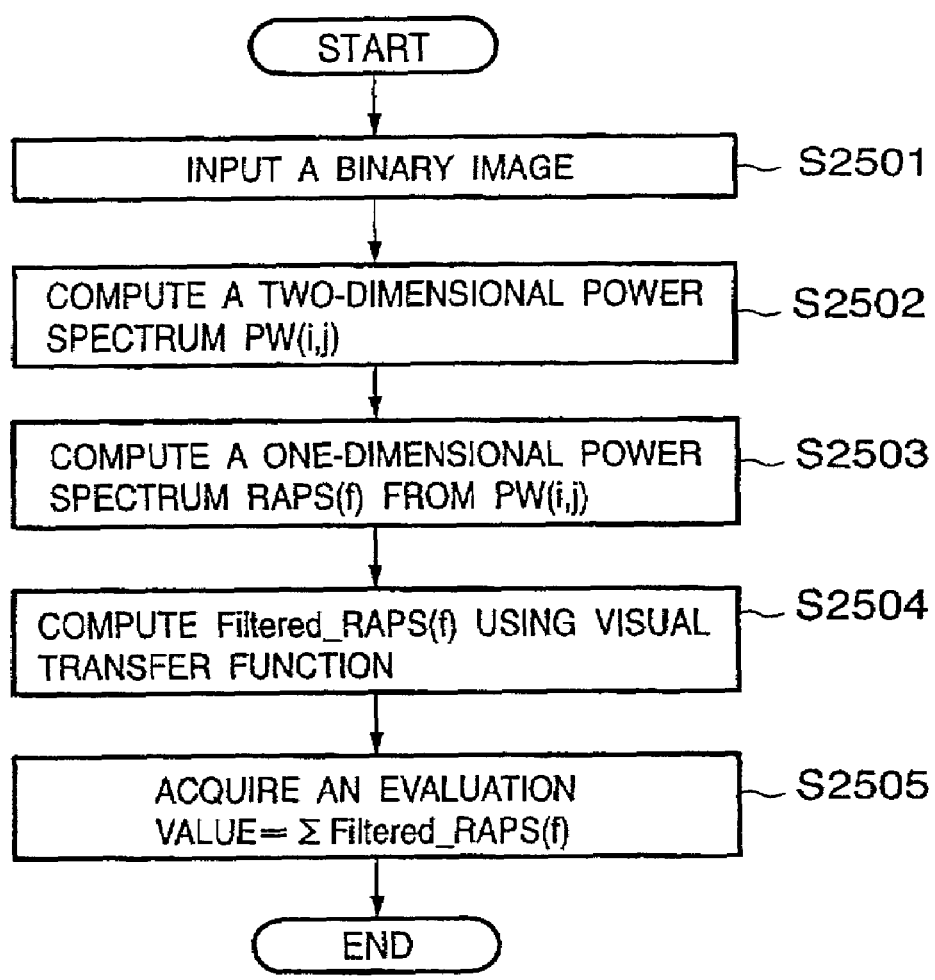
FIG. 38 is a flowchart showing an evaluation value computing process of a binary image according to a fifth embodiment.

FIG. 38 is a flowchart showing the evaluation value computing process of the binary image according to the fifth embodiment. First, the binary image created by using the candidate diffusion coefficient set for each gray level g is read (step S2501). Thereafter, the two-dimensional Fourier transformation of the binary image is performed to acquire a two-dimensional power spectrum PW (i, j) (step S2502). The description of the processing thereafter is omitted since it is the same as the steps S1304 to S1306 shown in FIG. 29.

According to the fifth embodiment, it is possible to evaluate the binary image at high speed as it is not necessary to allow for characteristics of the printer.

Sixth Embodiment

While the initial value of the error buffer 308 is "0" in the aforementioned embodiments in performing the binarization process of the input image in the aforementioned embodiments, a random number is used as the initial value in the sixth embodiment.

Figure 39:
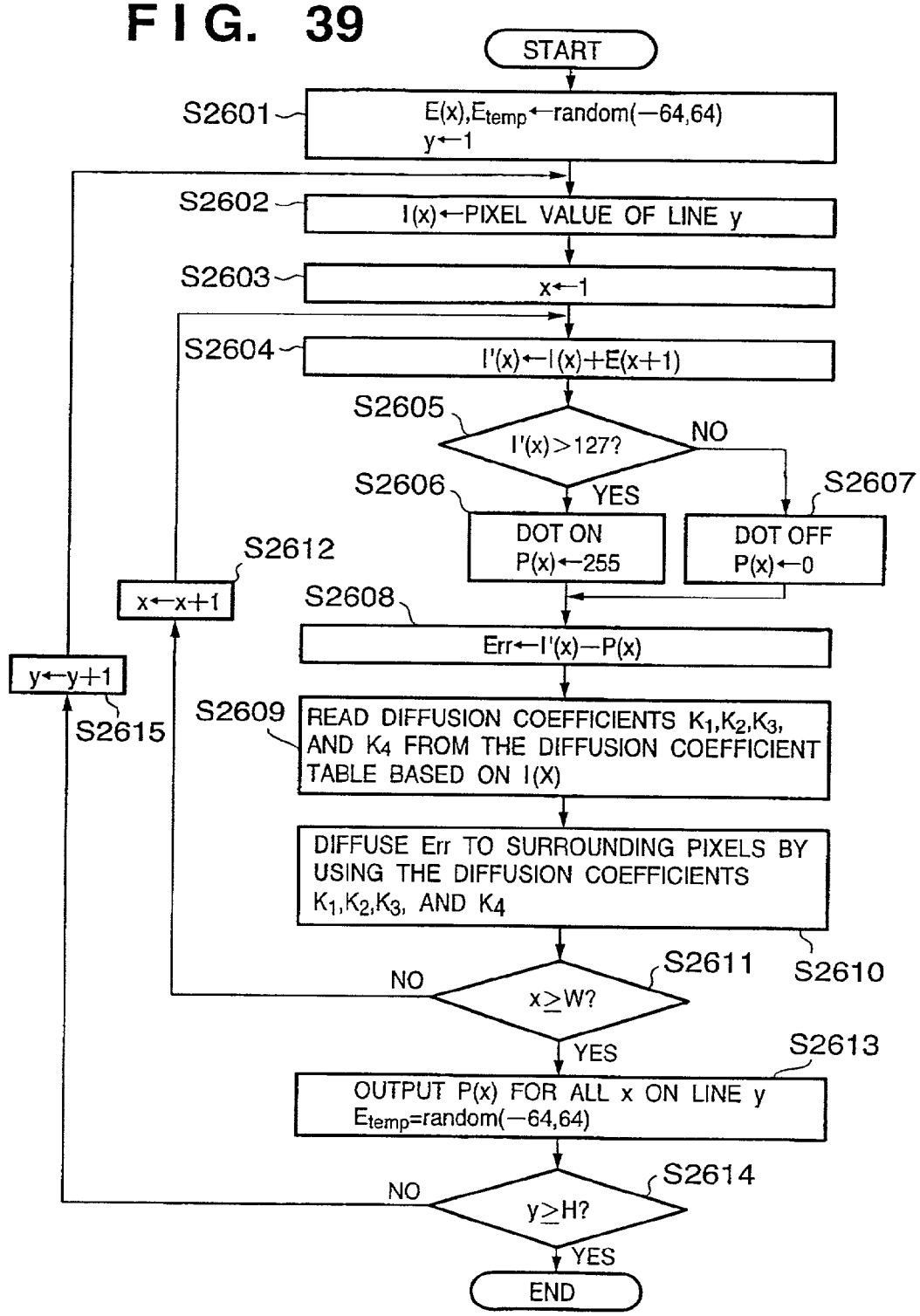
FIG. 39 is a flowchart showing a binarization process of an input image according to a sixth embodiment.

FIG. 39 is a flowchart showing the binarization process of the input image according to the sixth embodiment. First, $E_{temp}$ of the error buffer 308 and the initial values of (1) to E (W+2) are set to random numbers (integers) in the range of –64 to 64 (step S2601). The description of the processing thereafter, from the steps S2602 to S2612, is omitted since it is the same as the steps S702 to S712 shown in FIG. 25.

Next, after completing the binarization process of the data equivalent to one line, any integer between "–64" and "64" is randomly selected and is assigned to $E_{temp}$ (step S2613). The subsequent steps S2614 and S2615 are the same as the steps S714 and S715 shown in FIG. 25, and the binarization process is finished when the line number y reaches the vertical size H of the input image.

According to the sixth embodiment, it is possible to alleviate the phenomenon of the dots regularly lining up in horizontal direction, as seen in the case where the initial value of the error buffer is "0".

Seventh Embodiment

While the diffusion coefficient to be stored in the diffusion coefficient table 13 in the case where the gray level g is "0" (g=0) is the same as that in the case where the gray level g is "1" (g=1) in the aforementioned embodiments, the binarization error is not diffused in the case of g=0 in this seventh embodiment. In addition, the binarization error is not diffused either in the case of the gray level g=255. FIG. 40 is a diagram showing an example of the diffusion coefficient table according to the seventh embodiment.

According to the seventh embodiment, it is possible to implement higher-contrast binarization even in the case of the multivalued image of which input image is delimited by white and black areas (areas of which input level of gray scale is 0 or 255) since the binarized portion have no influence beyond the white and black region.

As described above, according to the image processing apparatuses and methods according to the third to seventh embodiment, it is possible to acquire good processing results for all the levels of gray scale by using an optimum parameter for each input level of gray scale in the process of converting the inputted multi-level gray scale image into an image having a smaller number of levels of gray scale.

Other Embodiments

Moreover, the present invention can also be implemented by performing a process combining the processes in the aforementioned plurality of embodiments.

In addition, the present invention can be applied either to a system comprised of a plurality of devices (such as a host computer, an interface device, a reader and a printer) or to an apparatus comprised of one device (such as a copier or a facsimile).

Furthermore, it is needless to say that the object of the present invention can also be attained by supplying a storage medium storing a program code of software for implementing functions of the aforementioned embodiments to the system or the apparatus and having a computer (a CPU or a MPU) of the system or the apparatus read and execute the program code stored in the storage medium.

In this case, the program code read from the storage medium itself implements the functions of the aforementioned embodiments, and the storage medium storing the program code constitutes the present invention.

For the storage medium for supplying the program code, a floppy disk, a hard disk, an optical disk, a magneto-optical disk, a CD-ROM, a CD-R, a magnetic tape, a nonvolatile memory card, a ROM and so on can be used for instance.

In addition, needless to say, it is not only that execution of the program code read by the computer implements the functions of the aforementioned embodiments but it also includes the cases where, based on instructions of the program code, an OS (operating system) and so on operating on the computer perform part or all of the actual process by which the functions of the aforementioned embodiments are implemented.

Furthermore, needless to say, it also includes the cases where the program code read from the storage medium is written to the memory provided to a feature expansion board inserted into the computer or a feature expansion unit connected to the computer, and then, based on instructions of the program code, a CPU and so on provided to the feature expansion board or the feature expansion unit perform part or all of the actual process by which the functions of the aforementioned embodiments are implemented.

As many apparently widely different embodiments of the present invention can be made without departing from the spirit and scope thereof, it is to be understood that the invention is not limited to the specific embodiments thereof except as defined in the claims.

What is claimed is:

1. An image processing apparatus for quantizing input multivalued image data by a multivalued error diffusion method, selecting a predetermined dot pattern based on the quantized image data and outputting a binary image, comprising:

error calculation means for calculating corrected value from a gray-level pixel value and a processed pixel diffusion error of the input image, and calculating a quantization error from said pixel value and an output density level corresponding to the corrected value;

image generation means for first acquiring a diffusion coefficient corresponding to a pixel value of said input image, and distributing said quantization error to surrounding pixels according to a weight assignment by the diffusion coefficient to generate a binary image;

diffusion coefficient generation means for generating a plurality of candidate diffusion coefficients;

computing means for acquiring an evaluation value for the binary image generated by said image generation means; and selection means for selecting the diffusion coefficient corresponding to the pixel value of said input image from said plurality of candidate diffusion coefficients based on said evaluation value.

2. The image processing apparatus according to claim 1, wherein said image generation means generates the binary image from said candidate diffusion coefficients.

3. The image processing apparatus according to claim 1, wherein said computing means converts an output image into a frequency domain and performs computation in the frequency domain.

4. The image processing apparatus according to claim 1, wherein said selection means selects, based on the evaluation values for each gray level value of the input image, an error diffusion coefficient that yields the minimum evaluation value.

5. The image processing apparatus according to claim 1, wherein said selection means selects the error diffusion coefficient based on a plurality of said evaluation values of a plurality of gray level values.

6. An image processing method for quantizing input multivalued image data by a multivalued error diffusion method, selecting a predetermined dot pattern based on the quantized image data and outputting a binary image, comprising:
   an error calculation step of calculating corrected value from a gray-level pixel value and a processed pixel diffusion error of an input image, and calculating a quantization error from said pixel value and an output density level corresponding to the corrected value;
   an image generation step of acquiring a diffusion coefficient corresponding to a pixel value of said input image, and distributing said quantization error to surrounding pixels according to a weight assignment by the diffusion coefficient to generate the binary image;
   a diffusion coefficient generation step of generating a plurality of candidate diffusion coefficients;
   a computing step of acquiring an evaluation value for the binary image generated in said image generation step; and
   a selection step of selecting the diffusion coefficient corresponding to the pixel value of said input image from said plurality of candidate diffusion coefficients based on said evaluation value.

7. The image processing method according to claim 6, wherein said image generation step generates the binary image from said candidate diffusion coefficients.

8. The image processing method according to claim 6, wherein said computing step converts an output image into a frequency domain and performs computation in the frequency domain.

9. The image processing method according to claim 6, wherein said selection step selects, based on the evaluation values for each gray level value of the input image, an error diffusion coefficient that yields the minimum evaluation value.

10. The image processing method according to claim 6, wherein said selection step selects the error diffusion coefficient based on a plurality of said evaluation values for a plurality of gray level values.

11. An image processing apparatus for converting a multi-level gray scale input image into an image having a smaller number of levels of gray scale, comprising:
   generation means for generating a parameter for the process of converting said multi-level gray scale input image into the image having a smaller number of levels of gray scale according to a characteristic of said input image;
   computing means for acquiring an evaluation value of the output image having a smaller number of levels of gray scale than said input image; and
   selection means for selecting said parameter based on said evaluation value,
   wherein said process of converting the input image into the image having the smaller number of levels of gray scale is an error diffusion method, and
   wherein said parameter is an error diffusion coefficient of said error diffusion method.

12. The image processing apparatus according to claim 11, wherein said computing means computes the evaluation value of said output image according to a characteristic of an output unit.

13. The image processing apparatus according to claim 12, wherein said computing means involves the step of converting the output image into a frequency domain and processing in the frequency domain.

14. The image processing apparatus according to claim 11, wherein said characteristic of the input image is an input pixel value.

15. The image processing apparatus according to claim 12, wherein said characteristic of the output unit includes any or all of resolution, dot size and ink concentration.

16. The image processing apparatus according to claim 15, wherein said computing means includes rendering said output image as multi-level gray scale.

17. The image processing apparatus according to claim 15, wherein said computing means includes changing the size of said output image.

18. The image processing apparatus according to claim 11, wherein said error diffusion method sets the initial error value of the input pixel value and the output pixel value to 0.

19. The image processing apparatus according to claim 11, wherein said error diffusion method sets the initial error value of the input pixel value and the output pixel value to a random number.

20. The image processing apparatus according to claim 11, wherein said error diffusion coefficient is, if the input gray level is a maximum value, the same as the diffusion coefficient of one level lower gray scale, and if the input gray level is a minimum value, the same as the diffusion coefficient of one level higher gray scale.

21. The image processing apparatus according to claim 11, wherein each value of said error diffusion coefficient is 0 if the input gray level is a maximum or minimum value.

22. An image processing method for converting a multi-level gray scale input image into an image having a smaller number of levels of gray scale, comprising:
   a generation step of generating a parameter for the process of converting said multi-level gray scale input image into the image having a smaller number of levels of gray scale according to a characteristic of said input image;
   a computing step of acquiring an evaluation value of the output image having a smaller number of levels of gray scale than said input image; and
   a selection step of selecting said parameter based on said evaluation value,
   wherein said process of converting the input image into the image having the smaller number of levels of gray scale is an error diffusion method, and
   wherein said parameter is an error diffusion coefficient of said error diffusion method.

23. A computer-readable storage medium storing an image processing program for converting a multi-level gray scale input image into an image having a smaller number of levels of gray scale, comprising:
   a generation module for generating a parameter for a process of converting said multi-level gray scale input image into an image having a smaller number of levels of gray scale according to a characteristic of said input image;
   a computing module for acquiring an evaluation value of the output image having a smaller number of levels of gray scale than said input image; and a selection module for selecting said parameter based on said evaluation value, wherein said process of converting the input image into the image having the smaller number of levels of gray scale is an error diffusion method, and wherein said parameter is an error diffusion coefficient of said error diffusion method.

24. A computer-readable storage medium storing an image processing program for converting a multi-level gray scale input image into an image having a smaller number of levels of gray scale, comprising:

an error calculation module for calculating corrected value from a gray-level pixel value and a processed pixel diffusion error of the input image, and calculating a quantization error from said pixel value and an output density level corresponding to the corrected value;

an image generation module for acquiring a diffusion coefficient corresponding to a pixel value of said input image, and distributing said quantization error to surrounding pixels according to a weight assignment by the diffusion coefficient to generate a binary image;

a diffusion coefficient generation module for generating a plurality of candidate diffusion coefficients;

a computing module for acquiring an evaluation value for the binary image generated by said image generation module; and a selection module for selecting the diffusion coefficient corresponding to the pixel value of said input image from said plurality of candidate diffusion coefficients based on said evaluation value.

25. An image processing apparatus for converting a multi-level gray scale input image into an image having a smaller number of levels of gray scale, comprising:

generation means for generating a parameter for the process of converting said multi-level gray scale input image into the image having a smaller number of levels of gray scale according to a characteristic of said input image;

computing means for acquiring an evaluation value of the output image having a smaller number of levels of gray scale than said input image; and selection means for selecting said parameter based on said evaluation value;

wherein said computing means computes the evaluation value of said output image according to a characteristic of an output unit, and wherein said computing means involves the step of converting the output image into a frequency domain and processing in the frequency domain.

26. An image processing method for converting a multi-level gray scale input image into an image having a smaller number of levels of gray scale, comprising:

a generation step of generating a parameter for the process of converting said multi-level gray scale input image into the image having a smaller number of levels of gray scale according to a characteristic of said input image;

a computing step of acquiring an evaluation value of the output image having a smaller number of levels of gray scale than said input image; and a selection step of selecting said parameter based on said evaluation value, wherein said computing step computes the evaluation value of said output image according to a characteristic of an output unit, and wherein said computing step involves the step of converting the output image into a frequency domain and processing in the frequency domain.

27. A computer-readable storage medium storing an image processing program for converting a multi-level gray scale input image into an image having a smaller number of levels of gray scale, comprising:

a generation module for generating a parameter for a process of converting said multi-level gray scale input image into an image having a smaller number of levels of gray scale according to a characteristic of said input image;

a computing module for acquiring an evaluation value of the output image having a smaller number of levels of gray scale than said input image; and a selection module for selecting said parameter based on said evaluation value, wherein said computing module computes the evaluation value of said output image according to a characteristic of an output unit, and wherein said computing module involves the step of converting the output image into a frequency domain and processing in the frequency domain.

* * * * *